US012521389B2

(12) United States Patent
Sun et al.

(10) Patent No.: US 12,521,389 B2
(45) Date of Patent: Jan. 13, 2026

(54) THERAPEUTIC APPROACH TO LUNG DISEASE

(71) Applicants: The Regents of the University of California, Oakland, CA (US); Children's Hospital of Philadelphia, Philadelphia, PA (US); Lisa R. Young, Philadelphia, PA (US)

(72) Inventors: Xin Sun, La Jolla, CA (US); Jinhao Xu, La Jolla, CA (US); Lisa Young, Philadelphia, PA (US)

(73) Assignees: THE REGENTS OF THE UNIVERSITY OF CALIFORNIA, Oakland, CA (US); VANDERBILT UNIVERSITY, Nashville, TN (US); THE CHILDREN'S HOSPITAL OF PHILADELPHIA, Philadelphia, PA (US)

( * ) Notice: Subject to any disclaimer, the term of this patent is extended or adjusted under 35 U.S.C. 154(b) by 992 days.

(21) Appl. No.: 17/618,700

(22) PCT Filed: Jun. 12, 2020

(86) PCT No.: PCT/US2020/037569
§ 371 (c)(1),
(2) Date: Dec. 13, 2021

(87) PCT Pub. No.: WO2020/252368
PCT Pub. Date: Dec. 17, 2020

(65) Prior Publication Data
US 2022/0249471 A1    Aug. 11, 2022

Related U.S. Application Data

(60) Provisional application No. 62/861,620, filed on Jun. 14, 2019.

(51) Int. Cl.
| C07D 401/14 | (2006.01) |
| A61K 9/00 | (2006.01) |
| A61K 9/16 | (2006.01) |
| A61K 31/438 | (2006.01) |
| A61K 31/47 | (2006.01) |
| A61K 31/499 | (2006.01) |
| A61K 31/517 | (2006.01) |
| A61K 31/55 | (2006.01) |
| A61K 31/551 | (2006.01) |
| A61K 45/06 | (2006.01) |
| A61P 11/00 | (2006.01) |
| C07D 471/04 | (2006.01) |
| C07D 471/14 | (2006.01) |

(52) U.S. Cl.
CPC .......... *A61K 31/499* (2013.01); *A61K 9/0075* (2013.01); *A61K 9/1617* (2013.01); *A61K 45/06* (2013.01); *A61P 11/00* (2018.01)

(58) Field of Classification Search
CPC .. C07D 401/14; C07D 471/04; C07D 471/14; A61K 31/499; A61K 31/517; A61K 31/55; A61K 31/551; A61K 31/437; A61K 31/438; A61P 11/00
See application file for complete search history.

(56) References Cited

U.S. PATENT DOCUMENTS

| 7,638,625 | B2 * | 12/2009 | Ries | ................ | A61P 11/02 |
| | | | | | 540/500 |
| 8,759,372 | B2 * | 6/2014 | Roberts | ............ | C07D 471/04 |
| | | | | | 546/118 |
| 2005/0042179 | A1 | 2/2005 | Trunk | | |
| 2009/0176769 | A1 | 7/2009 | Anderson et al. | | |
| 2018/0030057 | A1 | 2/2018 | Degnan | | |
| 2022/0401439 | A1 * | 12/2022 | Coric | ............... | A61K 31/496 |
| 2023/0285390 | A1 * | 9/2023 | McGrath | .......... | C07K 16/2869 |

FOREIGN PATENT DOCUMENTS

| WO | WO-2007028812 A2 * | 3/2007 | ............ | C07H 15/26 |
| WO | 2019213660 A2 | 11/2019 | | |

OTHER PUBLICATIONS

Krause, Lydia, "What is Pulmonary Edema?", Healthline, https://www.healthline.com/health/pulmonary-edema (Year: 2022).*
Kuo, C. S. & Krasnow, M. A. Formation of a Neurosensory Organ by Epithelial Cell Slithering. Cell 163, 394-405, doi:10.1016/j.cell.2015.09.021 (2015).
Noguchi, M., Sumiyama, K. & Morimoto, M. Directed Migration of Pulmonary Neuroendocrine Cells toward Airway Branches Organizes the Stereotypic Location of Neuroepithelial Bodies. Cell Rep 13, 2679-2686, doi: 10.1016/j.celrep.2015.11.058 (2015).
Branchfield, K et al. Pulmonary neuroendocrine cells function as airway sensors to control lung immune response. Science 351, 707-710, doi:10.1126/science.aad7969 (2016).
Xie, Y et al. Mucociliary Transport in Healthy and Cystic Fibrosis Pig Airways. Ann Am Thorac Soc 15, S171-S176, doi:10.1513/AnnalsATS.201805-308AW (2018).
Cutz, E., Yeger, H. & Pan, J. Pulmonary neuroendocrine cell system in pediatric lung disease-recent advances. Pediatr Dev Pathol 10, 419-435, doi:10.2350/07-04-0267.1 (2007).
Sui, P. et al. Pulmonary neuroendocrine cells amplify allergic asthma responses. Science 360, doi:10.1126/science.aan8546 (2018).
Heath, D. et al. Pulmonary endocrine cells in hypertensive pulmonary vascular disease. Histopathology 16, 21-28, doi:10.1111/j.1365-2559.1990.tb01055.x (1990).

(Continued)

*Primary Examiner* — Brenda L Coleman

(74) *Attorney, Agent, or Firm* — Lei Fang, Esq.; Smith Tempel Blaha LLC

(57) ABSTRACT

The present disclosure provides a novel animal model of NEHI, and method of preventing and/or treating a pulmonary disease, particularly the lung-based complications in NEHI, such as pulmonary edema, by targeting the PNEC product, such as the CGRP signaling. Also disclosed is the pharmaceutical composition for preventing and/or treating a pulmonary edema and/or other pulmonary disease, particularly, NEHI, comprising one or more CGRP signaling antagonist and/or inhibitor of the present disclosure.

10 Claims, 6 Drawing Sheets

Specification includes a Sequence Listing.

(56) References Cited

OTHER PUBLICATIONS

Johnson, D. E., Wobken, J. D. & Landrum, B. G. Changes in bombesin, calcitonin, and serotonin immunoreactive pulmonary neuroendocrine cells in cystic fibrosis and after prolonged mechanical ventilation. Am Rev Respir Dis 137, 123-131, doi:10.1164/ajrccm/137.1.123 (1988).
Deterding, R. R., Pye, C., Fan, L. L. & Langston, C. Persistent tachypnea of infancy is associated with neuroendocrine cell hyperplasia. Pediatr Pulmonol 40, 157-165, doi:10.1002/ppul.20243 (2005).
Young, L. R., Deutsch, G. H., Bokulic, R. E., Brody, A. S. & Nogee, L. M. A mutation in TTF1/NKX2.1 is associated with familial neuroendocrine cell hyperplasia of infancy. Chest 144, 1199-1206, doi:10.1378/chest.13-0811 (2013).
Delaunois, RJ et al., "Modulation of the acetylcholine- and substance P-induced pulmonary edema calcitonin gene-related peptide in the rabbit" Jul. 1, 1994, the journal of Pharmacology and Experimental Therapeutics, vol. 270, Issue 1, abstract only.
Nevel et al., "Growth Trajectories and Oxygen Use in Neuroendocrine Cell Hyperplasia of Infancy", May 2018, Pediatric Pulmonology; vol. 53, Issue 5, pp. 646-663 (re-No. 1-16); abstract; p. 3, first, second and third paragraphs.
International Search Report dated Nov. 24, 2020 for PCT/US2020/037569.
Written Opinion of the International Search Authority dated Nov. 24, 2020 for PCT/US2020/037569.

\* cited by examiner

SEQUENCE LISTING

```
<160> NUMBER OF SEQ ID NOS: 4

<210> SEQ ID NO 1
<211> LENGTH: 372
<212> TYPE: PRT
<213> ORGANISM: Mus musculus

<400> SEQUENCE: 1

Met Ser Met Ser Pro Lys His Thr Thr Pro Phe Ser Val Ser Asp Ile
1               5                   10                  15

Leu Ser Pro Leu Glu Glu Ser Tyr Lys Lys Val Gly Met Glu Gly Gly
            20                  25                  30

Gly Leu Gly Ala Pro Leu Ala Ala Tyr Arg Gln Gly Gln Ala Ala Pro
        35                  40                  45

Pro Ala Ala Ala Met Gln Gln His Ala Val Gly His His Gly Ala Val
    50                  55                  60

Thr Ala Ala Tyr His Met Thr Ala Ala Gly Val Pro Gln Leu Ser His
65                  70                  75                  80

Ser Ala Val Gly Gly Tyr Cys Asn Gly Asn Leu Gly Asn Met Ser Glu
                85                  90                  95

Leu Pro Pro Tyr Gln Asp Thr Met Arg Asn Ser Ala Ser Gly Pro Gly
            100                 105                 110

Trp Tyr Gly Ala Asn Pro Asp Pro Arg Phe Pro Ala Ile Ser Arg Phe
        115                 120                 125

Met Gly Pro Ala Ser Gly Met Asn Met Ser Gly Met Gly Gly Leu Gly
    130                 135                 140

Ser Leu Gly Asp Val Ser Lys Asn Met Ala Pro Leu Pro Ser Ala Pro
145                 150                 155                 160

Arg Arg Lys Arg Arg Val Leu Phe Ser Gln Ala Gln Val Tyr Glu Leu
                165                 170                 175

Glu Arg Arg Phe Lys Gln Gln Lys Tyr Leu Ser Ala Pro Glu Arg Glu
            180                 185                 190

His Leu Ala Ser Met Ile His Leu Thr Pro Thr Gln Val Lys Ile Trp
        195                 200                 205

Phe Gln Asn His Arg Tyr Lys Met Lys Arg Gln Ala Lys Asp Lys Ala
    210                 215                 220

Ala Gln Gln Gln Leu Gln Gln Asp Ser Gly Gly Gly Gly Gly Gly Gly
225                 230                 235                 240

Gly Gly Ala Gly Cys Pro Gln Gln Gln Ala Gln Gln Ser Pro
                245                 250                 255

Arg Arg Val Ala Val Pro Val Leu Val Lys Asp Gly Lys Pro Cys Gln
                260                 265                 270

Ala Gly Ala Pro Ala Pro Gly Ala Ala Ser Leu Gln Ser His Ala Gln
            275                 280                 285

Gln Gln Ala Gln Gln Gln Ala Gln Ala Ala Gln Ala Ala Ala Ala Ala
```

```
                    290                 295                 300
Ile Ser Val Gly Ser Gly Ala Gly Leu Gly Ala His Pro Gly His
305                 310                 315                 320

Gln Pro Gly Ser Ala Gly Gln Ser Pro Asp Leu Ala His His Ala Ala
                325                 330                 335

Ser Pro Ala Gly Leu Gln Gly Gln Val Ser Ser Leu Ser His Leu Asn
                340                 345                 350

Ser Ser Gly Ser Asp Tyr Gly Ala Met Ser Cys Ser Thr Leu Leu Tyr
                355                 360                 365

Gly Arg Thr Trp
            370

<210> SEQ ID NO 2
<211> LENGTH: 371
<212> TYPE: PRT
<213> ORGANISM: Homo sapiens

<400> SEQUENCE: 2

Met Ser Met Ser Pro Lys His Thr Thr Pro Phe Ser Val Ser Asp Ile
1               5                   10                  15

Leu Ser Pro Leu Glu Glu Ser Tyr Lys Lys Val Gly Met Glu Gly Gly
                20                  25                  30

Gly Leu Gly Ala Pro Leu Ala Ala Tyr Arg Gln Gly Gln Ala Ala Pro
            35                  40                  45

Pro Thr Ala Ala Met Gln Gln His Ala Val Gly His His Gly Ala Val
        50                  55                  60

Thr Ala Ala Tyr His Met Thr Ala Ala Gly Val Pro Gln Leu Ser His
65                  70                  75                  80

Ser Ala Val Gly Gly Tyr Cys Asn Gly Asn Leu Gly Asn Met Ser Glu
                85                  90                  95

Leu Pro Pro Tyr Gln Asp Thr Met Arg Asn Ser Ala Ser Gly Pro Gly
                100                 105                 110

Trp Tyr Gly Ala Asn Pro Asp Pro Arg Phe Pro Ala Ile Ser Arg Phe
            115                 120                 125

Met Gly Pro Ala Ser Gly Met Asn Met Ser Gly Met Gly Gly Leu Gly
        130                 135                 140

Ser Leu Gly Asp Val Ser Lys Asn Met Ala Pro Leu Pro Ser Ala Pro
145                 150                 155                 160

Arg Arg Lys Arg Arg Val Leu Phe Ser Gln Ala Gln Val Tyr Glu Leu
                165                 170                 175

Glu Arg Arg Phe Lys Gln Gln Lys Tyr Leu Ser Ala Pro Glu Arg Glu
                180                 185                 190

His Leu Ala Ser Met Ile His Leu Thr Pro Thr Gln Val Lys Ile Trp
            195                 200                 205

Phe Gln Asn His Arg Tyr Lys Met Lys Arg Gln Ala Lys Asp Lys Ala
        210                 215                 220

Ala Gln Gln Gln Leu Gln Gln Asp Ser Gly Gly Gly Gly Gly Gly Gly
225                 230                 235                 240

Gly Thr Gly Cys Pro Gln Gln Gln Ala Gln Gln Ser Pro Arg
                245                 250                 255

Arg Val Ala Val Pro Val Leu Val Lys Asp Gly Lys Pro Cys Gln Ala
                260                 265                 270

Gly Ala Pro Ala Pro Gly Ala Ala Ser Leu Gln Gly His Ala Gln Gln
            275                 280                 285
```

```
Gln Ala Gln His Gln Ala Gln Ala Ala Gln Ala Ala Ala Ala Ala Ile
    290             295                 300
Ser Val Gly Ser Gly Gly Ala Gly Leu Gly Ala His Pro Gly His Gln
305             310                 315                 320
Pro Gly Ser Ala Gly Gln Ser Pro Asp Leu Ala His His Ala Ala Ser
                325                 330                 335
Pro Ala Ala Leu Gln Gly Gln Val Ser Ser Leu Ser His Leu Asn Ser
                340                 345                 350
Ser Gly Ser Asp Tyr Gly Thr Met Ser Cys Ser Thr Leu Leu Tyr Gly
            355                 360                 365
Arg Thr Trp
    370

<210> SEQ ID NO 3
<211> LENGTH: 21
<212> TYPE: DNA
<213> ORGANISM: Mus musculus

<400> SEQUENCE: 3
cccagtgcgc cccgccggaa g                                              21

<210> SEQ ID NO 4
<211> LENGTH: 21
<212> TYPE: DNA
<213> ORGANISM: Mus musculus

<400> SEQUENCE: 4
cccagtgcgc ccctccggaa g                                              21
```

THERAPEUTIC APPROACH TO LUNG DISEASE

CROSS-REFERENCE TO RELATED APPLICATION

This application is a 371 U.S. National Phase of PCT International Application No. PCT/US2020/037569 filed on Jun. 12, 2020, which claims benefit and priority to U.S. Provisional Application No. 62/861,620, filed on Jun. 14, 2019, the content of both are incorporated by reference herein in their entireties.

STATEMENT OF GOVERNMENT INTEREST

This invention was made with government support under HL146141 and awarded by the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on Jun. 10, 2020, is named 942103-2020_Sequence_Listing.txt and is 6,999 bytes in size.

FIELD OF INVENTION

The present disclosure relates generally to a new therapeutic approach to lung disease, particularly lung edema in Neuroendocrine Hyperplasia of Infancy (NEHI).

BACKGROUND OF INVENTION

The primary function of the lung is to perform gas-exchange and this role is vital for survival at first breath. Within the lung, gas-exchange is executed by the ~480 million alveoli while the elaborate branched airway tree serves as conduits for air passage to and from the alveoli. Poor gas-exchange, such as in adult diseases such as chronic obstructive pulmonary disease (COPD) and childhood diseases such as bronchopulmonary dysplasia (BPD), is invariably linked to reduced alveoli and gas-exchange surface area. Whether any airway epithelial cell type could modulate alveolar gas-exchange function remains unknown.

Pulmonary neuroendocrine cells (PNECs) represent a rare, but evolutionarily conserved airway epithelial cell population[1,2]. These idiosyncratic cells preferentially reside at airway branch points, the sites where inhaled particles are enriched[3,4]. It has been postulated that PNECs may function as sensors, responding to aerosol stimuli by secreting bioactive neuropeptides, neurotransmitters and amines[5]. It is recently showed that PNECs are essential for allergen-induced asthmatic responses, where they secrete neural peptides and neurotransmitters to nearby Group 2 innate lymphoid cells (ILC2s) and fellow airway epithelial cells to facilitate immune cell recruitment and goblet cell metaplasia[6]. In addition to asthma, increase of PNECs are documented in a variety of lung diseases such as COPD and BPD[7,9]. However, little is known whether these changes contribute to symptoms or are consequences of these diseases.

Neuroendocrine cell hyperplasia of infancy (NEHI) is a rare childhood interstitial lung disease[9]. NEHI patients are born normal, but present gas-exchange deficiency, hypoxemia and failure to thrive starting at 6-8 months of age. A major disconnect with NEHI is the lack of alveolar simplification, a histological phenotype that typically accompanies other diseases that present gas-exchange deficiency such as COPD and BPD. The grossly normal alveolar histology is also at odds with ground glass opacity observed in CT scans of many NEHI patients. Another unexplained observation is the audible crackles that are associated with breathing in these patients. In contrast to the lack of an apparent structural defect in the alveoli, the defining feature of NEHI is a characteristic increase of PNECs in the airway (i.e. PNEC hyperplasia). However, it is debated whether the increase of a rare cell type in the airway is the cause or the consequence of the poor gas-exchange efficiency of the distal alveoli. A key entry point towards understanding NEHI was the identification of a point mutation in the NKX2-1 gene associated with symptoms in a family of patients[10]. The same exact mutation, causing Arginine to Leucine transition in the putative DNA binding homeodomain of the protein, was identified in a separate, unrelated case.

Accompanying the unknown etiology, to date there is no disease-specific treatment for NEHI patients aside from supplemental oxygen. The treatment for NEHI is mainly supportive. Optimizing the child's nutritional status to promote adequate growth is important for overall health, and oxygen supplementation may also be required. There are currently no specific therapeutic agents, and limited information on the long-term prognosis is available as this disease has only been recently recognized.

SUMMARY OF THE INVENTION

In certain embodiments, the present disclosure provides the first animal model of NEHI by generating mice carrying the point mutation in the NKX2-1 gene. The present disclosure further provides that such mouse model with the mouse mutant is a faithful model of NEHI. With studies on this mouse model of NEHI, the present disclosure further provides that increased PNECs are indeed responsible for NEHI phenotypes. Furthermore, the present disclosure provides that excess secreted PNEC products, such as calcitonin gene-related peptide (CGRP), disrupt endothelial integrity, lead to persistent pulmonary edema, and in turn poor gas-exchange and failure to gain weight.

Therefore, the present disclosure provides the first disease-specific pharmacological treatment for NEHI. In certain embodiments, the present disclosure provides that CGRP signaling antagonists effectively alleviate pulmonary edema and poor gas-exchange, which are key pathological features of NEHI, suggesting a disease-specific treatment for NEHI. The present disclosure provides certain data from the mouse model of NEHI supporting the efficacy of this treatment.

Accordingly, disclosed herein is a method of treating and/or preventing lung disease in a patient in need thereof, by targeting CGRP signaling. The lung disease can be any lung disease, including, but not limited to, NEHI.

In certain embodiments, provided herein is a method of treating and/or preventing NEHI in a patient in need thereof, comprising administering to the patient a therapeutically effective amount of an inhibitor and/or antagonist that targets CGRP signaling. The present disclosure encompasses any inhibitors and/or antagonists, now known and/or later developed, that are capable of targeting CGRP signaling pathway.

In the methods provided herein, the inhibitor and/or antagonist that targets CGRP signaling can be a single and/or a combination of at least one such inhibitor and/or antagonist. In certain embodiments, the CGRP signaling inhibitor and/or antagonist of the present disclosure can be administered in a single pharmaceutical composition, or separately in more than one pharmaceutical composition. Accordingly, also provided herein is a pharmaceutical composition comprising a therapeutically effective amount of single and/or a combination of at least one inhibitor and/or antagonist that targets the CGRP signaling. In certain embodiments, the inhibitor and/or the antagonist of CGRP signaling can be administered via any suitable administration route, including, but not limited to, inhalation to target the lung, injection, and/or oral administration.

BRIEF DESCRIPTION OF THE DRAWINGS

FIG. 1A. A human pedigree of familial NEHI. Black dots/squares represent NEHI patients. An Argentine-to-Leucine point mutation was identified in all family members displaying NEHI symptoms. Panel adapted from Young, Deutsch, et al., Chest 2013[10]. FIG. 1B. Protein sequencing alignment of NKX2-1 showed high conservation between mouse (NP_033411.3, SEQ ID NO. 1) and human (NP_003308.1, SEQ ID NO. 2). The identified site of the point mutation (marked by arrowhead) is in a conserved (identical) site in the mouse and human.

FIG. 2A. Schematic of CRISPR/Cas9 strategy on introducing R191L point mutation in SEQ ID NO. 3 to Nkx2-1 gene in mice to generate Nkx2-1$^{R191L}$ mouse line having SEQ ID NO. 4. FIG. 2B. Restriction fragment length polymorphism (RFLP) analysis distinguishes different genotypes.

FIG. 3A. Quantification of PNECs by counting show an increased number in the mutant compared to the wild-type and heterozygotes controls. FIG. 3B. qRT-PCR of PNEC marker Ascl1 and Calca show increased transcripts of PNEC marker genes. For each gene expression, bars from left to right: Nkx2-1$^{+/+}$, Nkx2-1$^{L/+}$ and Nkx2-1$^{L/L}$. FIGS. 3C-3E. Representative immunostaining of PNEC marker CGRP on longitudinal sections of mouse airways. PNEC clusters are marked by arrows.

FIGS. 4A-4C. Representative body size to show that Nkx2-1$^{L/L}$ mutants showed reduced body size, recapitulating the failure to thrive human NEHI symptom. FIG. 4D. Growth curve quantifying the NEHI growth retardation phenotype. FIG. 4E. Oxygen saturation measured by pulse-ox showed decreased SpO$_2$, recapitulating poor gas-exchange in NEHI patients.

FIGS. 5A-5B. Lung wet-to-dry ratio (W/D ratio) measured at postnatal day 22 (P22) and P39, respectively, for all three genotypes. Nkx2-1$^{L/L}$ mutants showed increased fluid in the lung. FIG. 5C. Protein concentration of bronchoalveolar lavage (BAL) measured at P28 for all three genotypes, showing an increase that is likely from leaked plasma from vessels in Nkx2-1$^{L/L}$. WT=Nkx2-1$^{+/+}$; +/−=Nkx2-1$^{L/+}$; −/−=Nkx2-1$^{L/L}$. FIG. 5D. Cell counting of BAL at P28 for all three genotypes showing no change, indicating lack of overt inflammation. Genotype notation is the same as in FIG. 5C.

FIG. 6A. CGRP concentration in BAL was measured by ELISA. The Nkx2-1$^{L/L}$ show increased CGRP. FIG. 6B. Wild type mice were intranasally administrated with 10 ul 1 ng/ul CGRP or saline at P10, P12, P14 and P16. Lung wet-to-dry ratio measured at P18 showed that administration of CGRP, but not saline, led to increase of fluid in the lung.

FIGS. 7A-7C. Representative body size at P22 for Ctrl, NEHI and Calca Null; NEHI where the gene encoding CGRP is inactivated in the Nkx2-1$^{L/L}$ mutant background. The compound mutant (FIG. 7C) showed recovered body size compared to NEHI alone. FIG. 7D. Growth curve from P5 to P22 of each genotype bred by the same foster mother, provide quantitative evidence that Calca Null; NEHI compound mutants (line with diamonds) show improved weight compared to NEHI only (line with inverted triangles). FIG. 7E. Lung wet-to-dry ratio at P22 for each genotype showing improved ratio in the compound mutant (diamond group) compare to NEHI only (inverted triangle group). FIG. 7F. Oxygen saturation measured by pulse-ox at P22 for each genotype, showing recovered gas-exchange capacity in the compound mutant (diamond group) compared to control (inverted triangle group). Genotype notation: Ctrl: Nkx2-1$^{L/+}$; Calca$^{+/−}$. Calca Null: Nkx2-1$^{L/+}$; Calca$^{−/−}$. NEHI: Nkx2-1$^{L/L}$; Calca$^{+/−}$. Calca Null; NEHI: Nkx2-1$^{L/L}$; Calca$^{−/−}$.

FIG. 8A. Lung wet-to-dry ratio at P22 for each genotype showing improved ratio in the compound mutant (diamond group) compared to NEHI only mutant (inverted triangle group). FIG. 8B. Oxygen saturation measured by pulse-ox at P22 for each genotype, showing improved gas-exchange in the compound mutant (diamond group) compared to NEHI only mutant (inverted triangle group). Genotype notation: Ctrl: Nkx2-1$^{L/+}$; Cdh5-cre; Calcrl$^{F/+}$. Calcrl$^{cKO}$: Nkx2-1$^{L/+}$; Cdh5-cre; Calcrl$^{F/F}$. Nkx2-1$^{L/L}$: Nkx2-1$^{L/L}$; Cdh5-cre; Calcrl$^{F/+}$. Nkx2-1$^{L/L}$; Calcrl$^{cKO}$: Nkx2-1$^{L/L}$; Cdh5-cre; Calcrl$^{F/F}$.

FIG. 9A. Schematic of BIBN-4096 treatment protocol on mice. FIG. 9B. Representative body size at P22 for each group, showing improved size in the antagonist treated mutant (far right of treated group) versus vehicle DMSO treated mutant (far right of vehicle group). FIG. 9C. Lung wet-to-dry ratio at P22 for each group showing treatment leads to attenuation of fluid in lung (compare the two triangle groups). FIG. 9D. Oxygen saturation measured by pulse-ox at P22 for each group showing improved gas-exchange efficiency after treatment (compare the two triangle groups).

DETAINED DESCRIPTION OF THE INVENTION

Figures 1A, 1B:
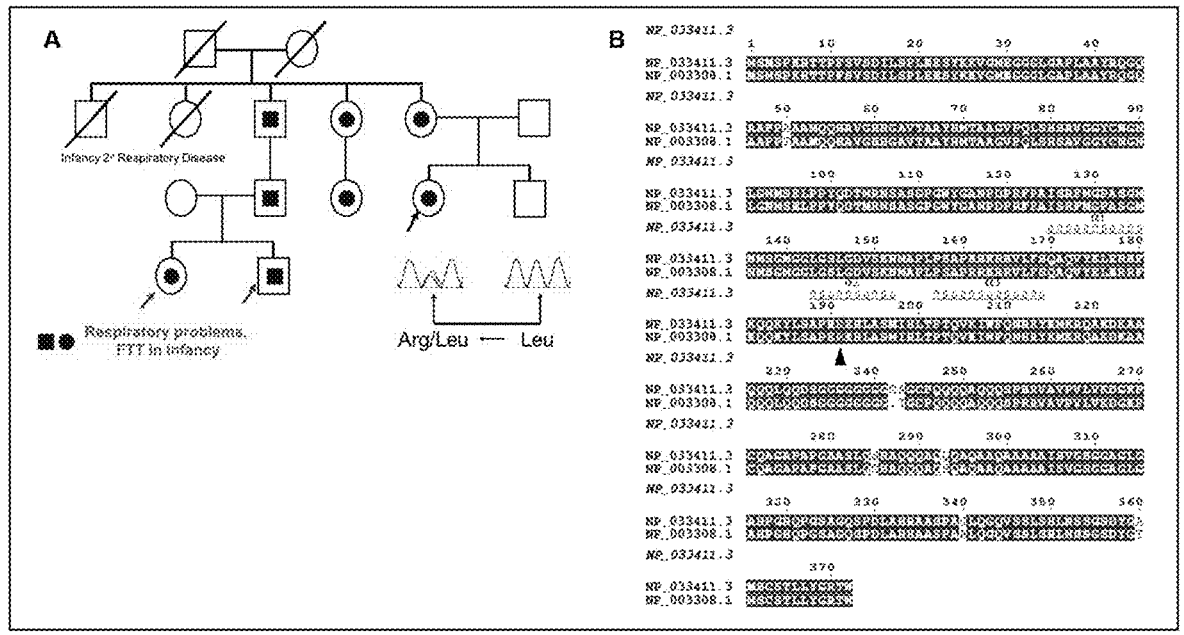
FIGS. 1A-1B. Generation of the first animal model of neuroendocrine cell hyperplasia of infancy (NEHI).

The present disclosure provides the first animal model of NEHI and the first disease-targeted approach to treat lung-based complications in Neuroendocrine Cell Hyperplasia of Infancy (NEHI) by targeting CGRP signaling. In certain embodiments, provided herein is a method of treating and/or preventing NEHI in a patient in need thereof, comprising administering to the patient a therapeutically effective amount of an inhibitor and/or antagonist that targets CGRP signaling. The present disclosure encompasses any inhibitors and/or antagonists, now known and/or later developed, that are capable of targeting CGRP signaling to be used for treating NEHI.

Definitions

As used herein, "treatment" or "treating" is an approach for obtaining beneficial or desired results including clinical results. For purposes of the present disclosure, beneficial or desired clinical results include, but are not limited to, one or more of the following: alleviating one or more symptoms resulting from the disease, diminishing the extent of the disease, stabilizing the disease (e.g., preventing or delaying the worsening of the disease), preventing or delaying the recurrence of the disease, delay or slowing the progression of the disease, ameliorating the disease state, providing a remission (partial or total) of the disease, decreasing the dose of one or more other medications required to treat the disease, delaying the progression of the disease, increasing or improving the quality of life, increasing weight gain, and/or prolonging survival. Also encompassed by "treatment" is a reduction of pathological consequence of the disease. The methods provided herein contemplate any one or more of these aspects of treatment.

As used herein, "lung diseases" are acute or chronic damages to the lung based in the duration of the disease. More particularly, the lung disease refers to lung-based complications in NEHI, which include, but not limited to, pulmonary edema.

Treatment and/or Prevention Method

Disclosed herein is a method of treating and/or preventing NEHI in a patient in need thereof, comprising administering to the patient a therapeutically effective amount of an inhibitor and/or antagonist that targets CGRP signaling. The present disclosure encompasses any inhibitors and/or antagonists, now known and/or later developed, that are capable of targeting CGRP signaling.

In various aspects, the method of treating and/or preventing NEHI in a patient in need thereof, comprises administration of a CGRP signaling small molecule inhibitor or antagonist, an antibody capable of inhibiting or antagonizing CGRP signaling activity, a peptide or peptidomimetic capable of inhibiting or antagonizing CGRP signaling activity, and/or a nucleic acid capable of inhibiting CGRP signaling activity, e.g., an anti-sense RNA, that can be administered to provide treatment and/or prevention of a lung disease, e.g., NEHI, in a patient in need thereof, by targeting CGRP signaling. Suitable small molecule inhibitors and antagonists of CGRP have been described that can be used in the presently disclosed methods for the treatment and/or prevention of NEHI in a patient in need thereof. A useful small molecule inhibitor or antagonist of CGRP signaling can include a combination of two or more CGRP ligand or receptor inhibitors and/or antagonists. In some aspects, the CGRP ligand or receptor inhibitor(s) or antagonist(s) has/have activity only in the peripheral nervous system and/or do(es) not cross the blood-brain barrier. In other aspects, the CGRP ligand or receptor inhibitor(s) or antagonist(s) have activity in the central nervous system and/or do(es) cross the blood-brain barrier. As used herein, the term "CGRP signaling antagonist" means any agent that interferes with CGRP binding and/or activation of the CGRP receptor, including receptor signaling.

Exemplary small molecule inhibitors and antagonists of CGRP signaling include, but are not limited to, olcegepant (BIBN4096BS), telcagepant (MK-0974), rimegepant (BMS-927711), BI 44370 TA, MK-3207, ubrogepant (MK-1602), and MK-8031. Further non-limiting examples of suitable small molecule inhibitors and antagonists of CGRP are those disclosed in U.S. Pat. Nos. 8,163,737 and 8,394,767; U.S. patent application Ser. No. 15/021,471; and International Patent Publ. Nos. WO/2007/146349A2 and WO/2009/020470A2.

Exemplary CGRP signaling antagonists include small molecule therapeutics that bind to CGRP, interfere with CGRP binding to its receptor, or block receptor activity. These include, without limitation, those described in PCT International Patent Application Nos. PCT/EP03/11762 to Rudolf et al., PCT/EP03/11763 to Rudolf et al., PCT/EP2004/000087 to Bauer et al., PCT/EP2005/003094 to Mueller et al., PCT/US03/16576 to Chaturvedula et al., PCT/US2004/040721 to Luo et al., PCT/US2003/038799 to Degnan et al., PCT/US2005/010330 to Degnan et al., PCT/GB99/03154 to Hill et al., PCT/US2004/007226 to Bell et al., PCT/US2004/007289 to Bell et al., PCT/US2004/007686 to Bell et al., PCT/US2004/007678 to Bell et al., PCT/US2004/007715 to Bell et al., PCT/US2004/011254 to Burgey et al., PCT/US2004/010851 to Burgey et al., PCT/US2004/011280 to Burgey et al., PCT/US2004/020206 to Burgey et al., PCT/US2004/021888 to Bell et al., PCT/US2004/020209 to Burgey et al., PCT/US2005/002199 to Burgey et al., PCT/US2005/031713 to Bell et al., PCT/US2005/031617 to Bell et al., PCT/US2005/031712 to Bell et al., PCT/US2005/032036 to Williams et al., PCT/US2005/032041 to Bell et al., PCT/US2005/032288 to Bell et al., PCT/US2005/035654 to Burgey et al., and U.S. Patent Application Publ. Nos. 20080139537 to Doods et al., 20080139591 to Doods et al., 20080125413 to Burgey et al. 20080113966 to Burgey et al., 20080096878 to Bell et al., 20080090806 to Paone et al., 20080070899 to Burgey et al., 20080004304 to Bell et al., 20080004261 to Gutierrez et al., 20070293470 to Williams et al., 20070287697 to Paone et al., 20070287696 to Burgey et al., 20070265225 to Wood et al., 2007/0259850 to Mercer et al., 20070225272 to Burgey et al., 20070149503 to Chaturvedula et al., 20070149502 to Chaturvedula et al., 20070111982 to Bell et al., 20070049577 to Han et al., 20060211712 to Bell et al., 20060194783 to Burgey et al., 20060189600 to Bell et al., 20060189593 to Bell et al., 20060183700 to Vater et al., 20060173046 to Bell et al., 20060148790 to Burgey et al., 20060148779 to Bell et al., 20060135511 to Burgey et al., 2006/0094707 to Chaturvedula et al., 20050256098 to Burgey et al., 20050215576 to Degnan et al., 20040229861 to Burgey et al., 20040204397 to Chaturvedula et al., and 20040063735 to Chaturvedula et al.. Pharmaceutical compositions suitable for administering such agents are also disclosed therein.

ommercially available CGRP signaling antagonists, include, but are not limited to: BIBN4096BS (Boehringer Ingelheim), which is also known as olcegepant or N-((1R)-2-(((1S)-5-amino-1-((4-(pyridin-4-yl) piperazin-1-yl) carbonyl) pentyl) amino)-1-(3,5-dibromo-4-hydroxybenzyl)-2-oxoethyl)-4-(2-oxo-1,4-dihydroquinazolin-3 (2H)-yl) piperidine-1-carboxamide (Edvinsson, "Clinical Data on the CGRP signaling Antagonist BIBN4096Bs for Treatment of Migraine Attacks," CNS Drug Rev. 11 (1): 69-76 (2005), MK-0974 (Merck), which is also known as telcagepant or N-((3R,6S)-6-(2,3-Difluorophenyl)-2-oxo-1-(2,2,2-trifluoroethyl) hexahydro-1H-azepin-3-yl)-4-(2-oxo-2,3-dihydro-1H-imidazo [4,5-b]pyridin-1-yl) piperidine-1-carboxamide (Salvatore et al., "Pharmacological Characterization of MK-0974, a Potent and Orally Active CGRP Receptor Antagonist for the Treatment of Migraine," J. Pharmacol. Exp. Ther. 324 (2): 416-21 (2007), and MK-3207, which is also known as 2-((8R)-8-(3,5-Difluorophenyl)-10-oxo-6,9-diazaspiro (4.5) dec-9-yl)-N-((2R)-2'-oxo-1,1',2',3-tetrahydrospiro (indene-2,3'-pyrrolo [2,3-b]pyridin)-5-yl) acetamide (Bell et al., "Discovery of MK-3207: A Highly Potent, Orally Bioavailable CGRP Receptor Antagonist," ACS Med. Chem. Lett. 1 (1): 24-29 (2010); Salvatore et al., "Pharmacological Properties of MK-3207, a Potent and Orally Active Calcitonin Gene-related Peptide Receptor Antagonist," J. Pharmacol. Exp. Ther. 333 (1): 152-160 (2010). These drugs are or have been used in clinical trials for treatment of migraine.

A number of other CGRP signaling antagonists are also known in the art. By way of example, suitable hydroxypyridine carboxamide CGRP signaling antagonists include, without limitation, 4-bromo-N-(3,5-difluorobenzyl)-6-(1,1-dioxido-1,2-thiazinan-2-yl)-3-hydroxypyridine-2-carboxamide; 4-bromo-N-(3-fluorobenzyl)-6-(1,1-dioxido-1,2-thiazinan-2-yl)-3-hydroxypyridine-2-carboxamide; 4-bromo-N-(t-butyl-acetate)-6-(1,1-dioxido-1,2-thiazinan-2-yl)-3-hydroxypyridine-2-carboxamide; 4-bromo-N-((cyclobutylcarbamoyl)methyl)-6-(1,1-dioxido-1,2-thiazinan-2-yl)-3-hydroxypyridine-2-carboxamide; 4-bromo-N-((cyclohexylcarbamoyl)methyl)-6-(1,1-dioxido-1,2-thiazinan-2-yl)-3-hydroxypyridine-2-carboxamide; 4-bromo-N-((adamantylcarbamoyl)methyl)-6-(1,1-dioxido-1,2-thiazinan-2-yl)-3-hydroxypyridine-2-carboxamide; 4-bromo-N-((m-diphenylcarbamoyl)methyl)-6-(1,1-dioxido-1,2-thiazinan-2-yl)-3-hydroxypyridine-2-carboxamide; N-(3,5-difluorobenzyl)-6-(1,1-dioxido-1,2-thiazinan-2-yl)-8-hydroxynaphtyridine-7-carboxamide; N-(3-iodobenzyl)-6-(1,1-dioxido-1,2-thiazinan-2-yl)-8-hydroxynaphtyridine-7-carboxamide; N-(3,5-dichlorobenzyl)-6-(1,1-dioxido-1,2-thiazinan-2-yl)-8-hydroxynaphtyridine-7-carboxamide; methyl 2-{[3,5-difluorobenzyl)amino]carbonyl}-6-(1,1-dioxido-1,2-thiazinan-2-yl)-3-hydroxyisonicotinate; and methyl 2-({[t-butoxycarbonyl)methyl]amino}carbonyl)-6-(1,1-dioxido-1,2-thiazinan-2-yl)-3-hydroxyisonicotinate.

By way of example, suitable oxepino[3,4-e]indazol-8-one and azepino[3,4-e]indazol-8-one CGRP signaling antagonists include, without limitation, (S)-4-bromo-7-(2-oxo-2-(4-(2-oxo-1,2-dihydroquinolin-3-yl)piperidin-1-yl)ethyl)-6,7-dihydro-3H-oxepino[3,4-e]indazol-8(1 OH)-one; (S)-1,4-dibromo-7-(2-oxo-2-(4-(2-oxo-1,2-dihydroquinolin-3-yl) piperidin-1-yl)ethyl)-9-(2,2,2-trifluoroethyl)-6,7,9,10-tetrahydroazepino[3,4-e]indazol-8(3H)-one; and (S)-1,4-dibromo-7-(2-(4-(8-fluoro-2-oxo-1,2-dihydroquinolin-3-yl) piperidin-1-yl)-2-oxoethyl)-9-(2,2,2-trifluoroethyl)-6,7,9,10-tetrahydroazepino[3,4-e]indazol-8(3H)-one.

By way of example, suitable azepine CGRP signaling antagonists include, without limitation, N-[(3R,7R)-1-(cyclopropylmethyl)-2-oxo-7-phenylazepan-3-yl]-4-(2-oxo-1,4-dihydroquinazolin-3 (2H)-yl)piperidine-1-carboxamide; tert-butyl [(3R,7R)-2-oxo-3-({[4-(2-oxo-1,4-dihydroquinazolin-3 (2H)-yl)piperidin-1-yl]carbonyl}amino)-7-phenylazepan-1-yl acetate; tert-butyl [(3R,7R)-2-oxo-3-({[4-(2-oxo-1,2,4,5-tetrahydro-3H-1,3-benzodiazepin-3-yl) piperidin-1-yl]carbonyl}amino)-7-phenylazepan-1-yl] acetate; N—R (3R,6S)-1-(cyclopropylmethyl)-2-oxo-6-phenylazepan-3-yl]-4-(2-oxo-1,4-dihydroquinazolin-3(2H)-yl) piperidine-1-carboxamide; N—R (3S,6R)-1-(cyclopropylmethyl)-2-oxo-6-phenylazepan-3-yl]-4-(2-oxo-1,4-dihydroquinazolin-3(2H)-yl) piperidine-1-carboxamide; cis-N-1-(cyclopropylmethyl)-2-oxo-6-phenylazepan-3-yl]-4-(2-oxo-1,4-dihydroquinazolin-3(2H)-yl) piperidine-1-carboxamide; N—R(3R,6S)-1-(cyclopropylmethyl)-2-oxo-6-phenylazepan-3-yll-4-(2-oxo-1,2,4,5-tetrahydro-3H-13-benzodiazepin-3-yl) piperidine-1-carboxamide; 4-(4-chloro-2-oxo-2,3-dihydro-1H-benzimidazol-1-yl)-N-f (3R,6S)-1-(2-methoxyethyl)-2-oxo-6-phenylazepan-3-yllpiperidine-1-carboxamide; N-f (3R,6S)-1-(2-methoxyethyl)-2-oxo-6-phenylazepan-3-yll-4-(4-methyl-2-oxo-2,3-dihydro-1H-benzimidazol-1-yl) piperidine-1-carboxamide; N-r (2S,6R)-4-(cyclopropylmethyl)-5-oxo-2-phenyl-14-oxazepan-6-yll-4-(2-oxo-1,2,4,5-tetrahydro-3H-1,3-benzodiazepin-3-yl) piperidine-1-carboxamide; N-(2S,6R)-4-(cyclopropylmethyl)-5-oxo-2-phenyl-1,4-oxazepan-6-yll-4-(2-oxo-2,3-dihydro-1H-benzimidazol-1-yl) piperidine-1-carboxamide; N-r (2S,6R)-4-(cyclopropylmethyl)-5-oxo-2-phenyl-1,4-oxazepan-6-yll-4-(6-fluoro-2-oxo-2,3-dihydro-1H-benzimidazol-1-yl) piperidine-1-carboxamide; N-f (2S*6R)-4-(cyclopropylmethyl)-5-oxo-2-phenyl-1,4-oxazepan-6-yll-4-(2-oxo-1,2-dihydroquinolin-3-yl) piperidine-1-carboxamide; N-r (2S,6R and 2R,6S)-4-(cyclopropylmethyl)-5-oxo-2-phenyl-1,4-oxazepan-6-yll-4-(2-oxo-1,4-dihydroquinazolin-3(2H)-yl) piperidine-1-carboxamide; 19-(2R,6S and 2R,6R)-4-(cyclopropylmethyl)-5-oxo-2-phenyl-1,4-oxazepan-6-yll-4-(2-oxo-1,4-dihydroquinazolin-3(2H)-yl) piperidine-1-carboxamide; cis N-r (3S,6S and 3R,6R)-1-(cyclopropylmethyl)-7-oxo-3-phenyl-1,4-diazepan-6-yll-4-(2-oxo-1,4-dihydroquinazolin-3 (2H)-yl) piperidine-1-carboxamide; N-[(3R)-1-(cyclopropylmethyl)-2-oxoazepan-3-yll-4-(2-oxo-1,4-dihydroquinazolin-3 (2H)-yl) piperidine-1-carboxamide; N-r (3R)-1-benzyl-2-oxoazepan-3-yll-4-(2-oxo-1,4-dihydroquinazolin-3(2H)-yl) piperidine-1-carboxamide; N-(1-benzyl-2-oxoazepan-3-yl)-4-(2-oxo-1,2,4,5-tetrahydro-3H-1,3-benzodiazepin-3-yl) piperidine-1-carboxamide; N-f (3R)-1-(4-hydroxybenzyl)-2-oxoazepan-3-yll-4-(2-oxo-1,4-dihydroquinazolin-3(2H)-yl) piperidine-1-carboxamide; N-f (3R)-1-(3-methoxybenzyl)-2-oxoazepan-3-yll-4-(2-oxo-1,4-dihydroquinazolin-3(2H)-yl) piperidine-1-carboxamide; N-r (3R)-1-(3-Hydroxybenzyl)-2-oxoazepan-3-yll-4-(2-oxo-14-dihydroquinazolin-3(2H)-yl) piperidine-1-carboxamide; N-[1-benzyl-3-(4-hydroxybenzyl)-2-oxoazepan-3-yl]-4-(2-oxo-1,4-dihydroquinazolin-3(2H)-yl) piperidine-1-carboxamide; and N-[3-(4-methoxybenzyl)-2-oxoazepan-3-yll-4-(2-oxo-2,3-dihydro-1H-benzimidazol-1-yl) piperidine-1-carboxamide.

Suitable peptide CGRP receptor antagonists are disclosed in U.S. Patent Application Publ. No. 20020068814 to Smith et al., and U.S. Patent Application Publ. No. 20080020978 to Gegg et al.. One exemplary peptide CGRP antagonist is CGRP8-37, which consists of residues 8-37 of SEQ ID NO: 2 below (Chiba et al., "Calcitonin Gene-Related Peptide Receptor Antagonist Human CGRP (8-37)," Am J Physiol 256 (2 Pt 1): E331-35 (1989).

In one embodiment, provided herein is a method for reducing the level of pulmonary edema in NEHI by one or more CGRP signaling antagonist and/or inhibitor of the present disclosure. Pulmonary edema is a condition caused by excess fluid in the lungs. Methods for measuring the extent of pulmonary edema are well known in the art. In one embodiment, the level of pulmonary edema is reduced by about 5% to about 100%. In one embodiment, the level of pulmonary edema is reduced by at least about 5%, at least about 10%, at least about 15%, at least about 20%, at least about 25%, at least about 30%, at least about 35%, at least about 40%, at least about 45%, at least 50%, at least about 55%, at least about 60%, at least about 65%, at least about 70%, at least about 75%, at least about 80%, at least about 85%, at least about 90%, at least about 95%, or about 100% in the subject.

Dosing and Administration

While it is possible for an active ingredient to be administered alone, it may be preferable to present them as pharmaceutical formulations or pharmaceutical compositions as described below. The formulations, both for veterinary and for human use, of the disclosure comprise at least one of the active ingredients, together with one or more acceptable carriers therefor and optionally other therapeutic ingredients. The carriers must be "acceptable" in the sense of being compatible with the other ingredients of the formulation and physiologically innocuous to the recipient thereof.

Each of the active ingredients can be formulated with conventional carriers and excipients, which will be selected in accord with ordinary practice. Tablets can contain excipients, glidants, fillers, binders and the like. Aqueous formulations are prepared in sterile form, and when intended for delivery by other than oral administration generally will be isotonic. All formulations will optionally contain excipients such as those set forth in the Handbook of Pharmaceutical Excipients (1986). Excipients include ascorbic acid and other antioxidants, chelating agents such as EDTA, carbohydrates such as dextrin, hydroxyalkylcellulose, hydroxyalkylmethylcellulose, stearic acid and the like. The pH of the formulations ranges from about 3 to about 11, but is ordinarily about 7 to 10. The therapeutically effective amount of active ingredient can be readily determined by a skilled clinician using conventional dose escalation studies. Typically, the active ingredient will be administered in a dose from 0.01 milligrams to 2 grams. In one embodiment, the dosage will be from about 10 milligrams to 450 milligrams. In another embodiment, the dosage will be from about 25 to about 250 milligrams. In another embodiment, the dosage will be about 50 or 100 milligrams. In one embodiment, the dosage will be about 100 milligrams. It is contemplated that the active ingredient may be administered once, twice or three times a day. Also, the active ingredient may be administered once or twice a week, once every two weeks, once every three weeks, once every four weeks, once every five weeks, or once every six weeks.

The pharmaceutical composition for the active ingredient can include those suitable for the foregoing administration routes. The formulations can conveniently be presented in unit dosage form and may be prepared by any of the methods well known in the art of pharmacy. Techniques and formulations generally are found in Remington's Pharmaceutical Sciences (Mack Publishing Co., Easton, Pa.). Such methods include the step of bringing into association the active ingredient with the carrier which constitutes one or more accessory ingredients. In general the formulations are prepared by uniformly and intimately bringing into association the active ingredient with liquid carriers or finely divided solid carriers or both, and then, if necessary, shaping the product.

Formulations suitable for oral administration can be presented as discrete units such as capsules, cachets or tablets each containing a predetermined amount of the active ingredient; as a powder or granules; as a solution or a suspension in an aqueous or non-aqueous liquid; or as an oil-in-water liquid emulsion or a water-in-oil liquid emulsion. The active ingredient may also be administered as a bolus, electuary or paste. In certain embodiments, the active ingredient may be administered as a subcutaneous injection.

A tablet can be made by compression or molding, optionally with one or more accessory ingredients. Compressed tablets can be prepared by compressing in a suitable machine the active ingredient in a free-flowing form such as a powder or granules, optionally mixed with a binder, lubricant, inert diluent, preservative, or surface-active agent. Molded tablets may be made by molding in a suitable machine a mixture of the powdered active ingredient moistened with an inert liquid diluent. The tablets may optionally be coated or scored and optionally are formulated so as to provide slow or controlled release of the active ingredient therefrom.

The active ingredient can be administered by any route appropriate to the condition. Suitable routes include inhalation, oral, rectal, nasal, topical (including buccal and sublingual), vaginal and parenteral (including subcutaneous, intramuscular, intravenous, intradermal, intrathecal and epidural), and the like. It will be appreciated that the preferred route may vary with for example the condition of the recipient. In certain embodiments, the active ingredients are bioavailable when inhaled and can therefore be dosed inhaled. In one embodiment, the patient is human.

Pharmaceutical Compositions

In certain embodiments, the present disclosure provides the pharmaceutical compositions comprising an effective amount of one or more CGRP signaling antagonist and/or inhibitor. In certain embodiments, such pharmaceutical composition and/or the active ingredient of the CGRP signaling antagonist and/or inhibitor will be administered through inhalation, to target the lung. Compositions intended for inhaled use may be prepared according to any method known to the art for the manufacture of pharmaceutical compositions and such compositions may contain one or more agents that are suitable for inhalation.

The pharmaceutical formulations can be present in the form of various inhalable formulations, e.g., administered to the lung in the form of an aerosol of particles of respirable size as known to the skilled artisan. The active ingredients can be preferably adapted to be administered, either together or individually, from dry powder inhaler(s) (DPIs), especially Turbuhaler®. (Astra AB), pressurized metered dose inhaler(s) (pMDIs), or nebulizer(s). It will be understood by those skilled in the art that the composition can be administered by any suitable such device provided that it is provided with a mechanism operable to actuate the device to deliver the appropriate dose of the medicament of the disclosure. Administration of an inhalable formulation can be continuous or intermittent. In various aspects, an inhalable formulation can be administered therapeutically; that is, administered to treat an existing disease or condition (e.g., lung disease). In further various aspects, an inhalable formulation can be administered prophylactically; that is, administered for prevention of a disease or condition.

The pH of the inhalable formulations can vary. For example, the pH can vary from about 2 to about 10 when using lower concentrations of milrinone. For compositions with a greater concentration of milrinone, the pH range can narrow. Aspects of the present invention have a pH range of about 2 to about 4. Others range from about 2.5 to about 3.5. Others range from about 2.6 to about 3.4. Others range from about 3 to about 3.2.

The inhalable formulation can be presented as a liquid or a dry powder. In order to assure proper particle size in a liquid aerosol, as a suspension, particles can be prepared in respirable size and then incorporated into the suspension formulation containing a propellant. Alternatively, formulations can be prepared in solution form in order to avoid the concern for proper particle size in the formulation. Solution formulations should be dispensed in a manner that produces particles or droplets of respirable size.

In various aspects, pharmaceutical inhalable formulations can be in the form of suspensions or as aerosols delivered from pressurized packs, with the use of a suitable propellant, e.g. dichlorodifluoromethane, trichlorofluoromethane, dichlorotetrafluoroethane, 1,1,1,2,3,3,3-heptafluoropropane, 1,1,1,2-tetrafluoroethane, carbon dioxide or other suitable gas. Such formulations may be delivered via a pressurized inhaler, an MDI. Exemplary MDI's typically include canisters suitable for delivering the pharmaceutical formulations. Canisters generally comprise a container capable of withstanding the vapour pressure of the propellant used such as a plastic or plastic-coated glass bottle or preferably a metal can, for example an aluminum can which may optionally be anodised, lacquer-coated and/or plastic-coated, which container is closed with a metering valve. Aluminum cans which have their inner surfaces coated with a fluorocarbon polymer are particularly preferred. Such polymers can be made of multiples of the following monomeric units: tetrafluoroethylene (PTFE), fluorinated ethylene propylene (FE P), perfluoroalkoxyalkane (PFA), ethylene tetrafluoroethylene (EFTE), vinyldienefluoride (PVDF), and chlorinated ethylene tetrafluoroethylene. Aspects of coatings used on all or part of the internal surfaces of an MDI are set forth in U.S. Pat. Nos. 6,143,277; 6,511,653; 6,253,762; 6,532,955; and 6,546,928.

In a further aspect, suitable pMDIs for administration of the compositions of the disclosure are those disclosed in U.S. Pat. Nos. 6,860,262; 7,836,880; and 7,740,463. Pressurized metered-dose inhalers (pMDI) are devices that deliver a specific amount of medication to the lungs, in the form of a short burst of aerosolized medicine that is inhaled by the patient. Hydrofluoroalkanes (HFA), such as either HFA 134a (1,1,1,2,-tetrafluoroethane) or HFA 227 (1,1,1,2,3,3,3-heptafluoropropane) or combinations of the two are the most commonly used aerosols; however, it will be understood by those skilled in the art that any suitable aerosol can be employed in the practice of the disclosure. MDIs can also include metering valves designed to deliver a metered amount of the formulation per actuation and incorporate a gasket to prevent leakage of propellant through the valve. The gasket can comprise any suitable elastomeric material such as for example low density polyethylene, chlorobutyl, black and white butadiene-acrylonitrile rubbers, butyl rubber and neoprene. Suitable valves are commercially available from manufacturers well known in the aerosol industry, for example, from Valois, France (e.g. DF10, DF30, DF60), Bespak plc, UK (e.g. BK300, BK356) and 3M-Neotechnic Ltd, UK (e.g. Spraymiser™). In various aspects, metering valves as set forth in U.S. Pat. Nos. 6,170,717; 6,315,173; and 6,318,603 can be used to deliver the disclosed pharmaceutical compositions. In further aspects, the MDIs can also be used in conjunction with other structures such as, without limitation, overwrap packages for storing and containing the MDIs, including those described in U.S. Pat. No. 6,390,291, as well as dose counter units such as, but not limited to, those described in U.S. Pat. Nos. 6,360,739 and 6,431,168.

In some aspects, the inhalable formulation is administered from a pressurized metered-dose inhaler (pMDI). A pMDI has two key components, namely a canister and an actuator (or mouthpiece). The canister has a vial for storing the solution coupled to a metering dose valve having an actuating stem. The container is housed in an actuator where the actuating step is in fluid communication with a discharge nozzle in the actuator. Actuation of the device releases a single metered dose of solution aerosol. The aerosol passes through the discharge nozzle resulting in a breaking up of the volatile propellant into droplets, followed by rapid evaporation of these droplets as they are inhaled into the lungs. The discharge nozzle preferably has an orifice diameter of 100-300 µm, more preferably 150-250 µm and most preferably 248 µm. This orifice size encourages the formation of droplets of the required size in the aerosol solution of the present invention. In a further aspect, a pMDI forms a fine aerosol of droplets which has a droplet size having a mass median aerodynamic diameter of 0.5-2.0 μm, or in some instances, 0.8-1.2 μm. This small droplet size facilitates deep lung penetration. The droplet size may be measured using conventional techniques, such as using a Next Generation Pharmaceutical Impactor (NGI) or an Andersen eight-stage impactor (ACI).

In various aspects, the pharmaceutical formulation can be present in the form of a dry powder formulation, the formulation of such can be carried out according to known techniques. Dry powder formulations for topical delivery to the lung by inhalation can, for example, be presented in capsules and cartridges of for example gelatine, or blisters of for example laminated aluminium foil, for use in an inhaler or insufflator. Powder blend formulations generally contain a powder mix for inhalation of the compound of the disclosure and a suitable powder base which includes lactose and, optionally, at least one additional excipient (e.g., carrier, diluent, etc.). In various aspects, each capsule or cartridge can generally contain between 20 μg and 10 mg of the at least one medicament. In one aspect, the formulation can be formed into particles comprising at least one medicament, and excipient material(s), such as by co-precipitation or coating. When employed as a dry powder, packaging of the formulation can be suitable for unit dose or multi-dose delivery. In the case of multi-dose delivery, the formulation can be pre-metered (e.g., as in Diskus®, see GB 2242134/U.S. Pat. Nos. 6,032,666, 5,860,419, 5,873,360, 5,590,645, 6,378,519 and 6,536,427 or Diskhaler, see GB 2178965, 2129691 and 2169265, U.S. Pat. Nos. 4,778,054, 4,811,731, 5,035,237) or metered in use (e.g. as in Turbuhaler, see EP 69715, or in the devices described in U.S. Pat. No. 6,321,747). An example of a unit-dose device is Rotahaler (see GB 2064336). In one aspect, the Diskus® inhalation device comprises an elongate strip formed from a base sheet having a plurality of recesses spaced along its length and a lid sheet hermetically but peelably sealed thereto to define a plurality of containers, each container having therein an inhalable formulation containing the at least one medicament, the lactose, optionally with other excipients. Preferably, the strip is sufficiently flexible to be wound into a roll. The lid sheet and base sheet will preferably have leading end portions which are not sealed to one another and at least one of the leading end portions is constructed to be attached to a winding means. Also, preferably the hermetic seal between the base and lid sheets extends over their whole width. The lid sheet can preferably be peeled from the base sheet in a longitudinal direction from a first end of the base sheet. Further suitable exemplary DPIs for administration of the compositions of the disclosure are those disclosed in U.S. Pat. Nos. 7,987,845; 7,958,890; and 7,896,005.

In various aspects, dry powder formulations can be prepared e.g. by agglomeration of the micronized particles of the active ingredients and possibly the micronized carrier particles using methods known in the art. In some instances, the dry inhalation powder composition is a mixture of the micronized particles of the active ingredients and carrier particles, the carrier particles being typically of coarser particle size. A method of preparing such mixtures typically comprises adding the micronized active ingredients and part of the carrier particles into a blender and mixing until the powder mixture is homogenous. The mixture is then sieved to reduce the number of particle clusters present. Thereafter the rest of carrier particles is added and mixed until the powder is again homogenous. The carrier materials in dry inhalation powder compositions can be carbohydrates. Carbohydrates suitable for use as a dry powder carrier material include, for example, monosaccharides such as fructose, maltose or glucose; disaccharides such as lactose sucrose or trehalose; polysaccharides such as raffinose or melezitose; and alditols such as mannitol, xylitol, lactitol and the like. Preferred carrier is lactose or glucose, lactose being most preferred. If the dry powder formulation contains a carrier, e.g. lactose, the total amount of the active ingredients can be about 0.05-50% (w/w), preferably about 1-10% (w/w), based on total weight of the composition. In some aspects, the mass median particle diameter of the can be between 5 and 150 μm, more preferably between 10 and 100 μm, most preferably between 15 and 80 μm. The disclosed dry powder formulation can further comprise additives such as solubilizers, stabilizers, flavouring agents, colorizing agents and preserving agents.

The term "nebulized" refers to a composition that has been transformed into a medical aerosol, optionally with ambient air, and which can be inhaled by a subject inhaling through a mouthpiece associated with a "nebulizer" (also referred to as inhaler herein). The term "aerosol" describes a nebulized liquid preparation consisting of fine particles carried by a gas, usually air, to the site of therapeutic action, or delivery target. In the context of the present nebulized compositions, "administering" and the like can include administration by inhalation, nasal administration, and the like. In some aspects the other substances that can enhance the nebulizing quality of the compositions. For instance, in some aspects substances selected from potassium chloride, sodium chloride, lactic acid, sodium lactate, citric acid, sodium citrate, phosphoric acid, mono, di, and tri basic sodium phosphate, acetic acid, sodium acetate, hydrochloric acid, sodium hydroxide, triacetin, monoacetin, propylene glycol, urea, sorbitol, dextrose, glycerol, and combinations thereof can be included in the compositions, and, without being bound by theory or mechanisms, such substances may increase the nebulization efficiency of the compositions. In other aspects, the nebulizing enhancing substances, or excipient is lactic acid. As indicated above, nebulizers, in which the drug is dissolved or dispersed in suspension form and delivered in the lung as fine nebulized particles are used with aspects of the present disclosure. Suitable nebulizers for administration of the compositions of the disclosure are those disclosed in U.S. Pat. Nos. 6,962,151; 8,015,969; and 8,001,963.

In this regard, the disclosed inhalable formulations can include a range of excipients. Some aspects, a disclosed inhalable composition can comprise about 1 wt %, 2 wt %, 3 wt %, 4 wt %, 5 wt %, 6 wt %, 7 wt %, 8 wt %, 9 wt %, or 10 w, wt %, 11 wt %, 12 wt %, 13 wt %, 14 wt %, 15 wt %, or 16 wt % (and any range in between) of another substance/excipient (e.g., lactic acid) in solution with the disclosed compound or active ingredient.

The inhalable compositions of the present disclosure may further comprise surfactants, particularly in compositions that are used in connection with metered dose inhalers. The surfactant of the pharmaceutical composition according to the invention can be chosen among different classes of surfactants of pharmaceutical use. Surfactants suitable to be used in the present invention are all those substances characterized by medium or low molecular weight that contain a hydrophobic moiety, generally readily soluble in an organic solvent but weakly soluble or insoluble in water, and a hydrophilic (or polar) moiety, weakly soluble or insoluble in an organic solvent but readily soluble in water. Surfactants are classified according to their polar moiety. Therefore surfactant with a negatively charged polar moiety are called anionic surfactants, while cationic surfactants have a positively charged polar moiety.

Uncharged surfactants are generally called nonionic, while surfactant charged both positively and negatively are called zwitterionic. Examples of anionic surfactants are salts of fatty acids (better known as soaps), sulphates, sulphate ethers and phosphate esters. Cationic surfactants are frequently based on polar groups containing amino groups. Most common nonionic surfactants are based on polar groups containing oligo-(ethylene-oxide) groups. Zwitterionic surfactants are generally characterized by a polar group formed by a quaternary amine and a sulphuric or carboxylic group.

In some aspects, the surfactant used in an inhalable formulation can be benzalkonium chloride, cetrimide, docusate sodium, glyceryl monolaurate, sorbitan esters, sodium lauryl sulphate, polysorbates, phospholipids, biliary salts. In a further aspect, the surfactant used in an inhalable formulation can be benzalkonium chloride, cetrimide, docusate sodium, glyceryl monolaurate, sorbitan esters, sodium lauryl sulphate, polysorbates, phospholipids, biliary salts.

Nonionic surfactants, such as polysorbates and polyethylene and polyoxypropylene block copolymers, known as "Poloxamers", can be used. Polysorbates are described in the CTFA International Cosmetic Ingredient Dictionary as mixtures of sorbitol and sorbitol anhydride fatty acid esters condensed with ethylene oxide. A particular example of nonionic surfactants are those of the series known as "Tween", e.g., the surfactant known as "Tween 80", a polyoxyethylensorbitan monolaurate available on the market. The presence of a surfactant, e.g., Tween 80, can be useful to reduce electrostatic charges found in formulations without it, the flow of the powder and the maintenance of the solid state in a homogeneous way without initial crystallization.

The disclosed inhalable formulation can be administered to a patient daily or periodically, e.g. one month on treatment and one month off treatment. The medicament may be administered as divided doses from 1 to 4 doses a day.

When used for oral use for example, tablets, troches, lozenges, aqueous or oil suspensions, dispersible powders or granules, emulsions, hard or soft capsules, syrups or elixirs may be prepared. Compositions intended for oral use may be prepared according to any method known to the art for the manufacture of pharmaceutical compositions and such compositions may contain one or more agents including sweetening agents, flavoring agents, coloring agents and preserving agents, in order to provide a palatable preparation. Tablets containing the active ingredient in admixture with non-toxic pharmaceutically acceptable excipient which are suitable for manufacture of tablets are acceptable. These excipients may be, for example, inert diluents, such as, for example, calcium or sodium carbonate, lactose, lactose monohydrate, croscarmellose sodium, povidone, calcium or sodium phosphate; granulating and disintegrating agents, such as, for example, maize starch, or alginic acid; binding agents, such as, for example, cellulose, microcrystalline cellulose, starch, gelatin or acacia; and lubricating agents, such as, for example, magnesium stearate, stearic acid or talc. Tablets may be uncoated or may be coated by known techniques including microencapsulation to delay disintegration and adsorption in the gastrointestinal tract and thereby provide a sustained action over a longer period. For example, a time delay material such as, for example, glyceryl monostearate or glyceryl distearate alone or with a wax may be employed.

Formulations for oral use may be also presented as hard gelatin capsules where the active ingredient is mixed with an inert solid diluent, for example calcium phosphate or kaolin, or as soft gelatin capsules wherein the active ingredient is mixed with water or an oil medium, such as, for example, peanut oil, liquid paraffin or olive oil.

Aqueous suspensions of the disclosure contain the active materials in admixture with excipients suitable for the manufacture of aqueous suspensions. Such excipients include a suspending agent, such as, for example, sodium carboxymethylcellulose, methylcellulose, hydroxypropyl methylcelluose, sodium alginate, polyvinylpyrrolidone, gum tragacanth and gum acacia, and dispersing or wetting agents such as, for example, a naturally occurring phosphatide (e.g., lecithin), a condensation product of an alkylene oxide with a fatty acid (e.g., polyoxyethylene stearate), a condensation product of ethylene oxide with a long chain aliphatic alcohol (e.g., heptadecaethyleneoxycetanol), a condensation product of ethylene oxide with a partial ester derived from a fatty acid and a hexitol anhydride (e.g., polyoxyethylene sorbitan monooleate). The aqueous suspension may also contain one or more preservatives such as, for example, ethyl or n-propyl p-hydroxy-benzoate, one or more coloring agents, one or more flavoring agents and one or more sweetening agents, such as, for example, sucrose or saccharin.

Oil suspensions may be formulated by suspending the active ingredient in a vegetable oil, such as, for example, arachis oil, olive oil, sesame oil or coconut oil, or in a mineral oil such as, for example, liquid paraffin. The oral suspensions may contain a thickening agent, such as, for example, beeswax, hard paraffin or cetyl alcohol. Sweetening agents, such as, for example, those set forth above, and flavoring agents may be added to provide a palatable oral preparation. These compositions may be preserved by the addition of an antioxidant such as, for example, ascorbic acid.

Dispersible powders and granules of the disclosure suitable for preparation of an aqueous suspension by the addition of water provide the active ingredient in admixture with a dispersing or wetting agent, a suspending agent, and one or more preservatives. Suitable dispersing or wetting agents and suspending agents are exemplified by those disclosed above. Additional excipients, for example sweetening, flavoring and coloring agents, may also be present.

The pharmaceutical compositions of the disclosure may also be in the form of oil-in-water emulsions. The oily phase may be a vegetable oil, such as, for example, olive oil or arachis oil, a mineral oil, such as, for example, liquid paraffin, or a mixture of these. Suitable emulsifying agents include naturally-occurring gums, such as, for example, gum acacia and gum tragacanth, naturally occurring phosphatides, such as, for example, soybean lecithin, esters or partial esters derived from fatty acids and hexitol anhydrides, such as, for example, sorbitan monooleate, and condensation products of these partial esters with ethylene oxide, such as, for example, polyoxyethylene sorbitan monooleate. The emulsion may also contain sweetening and flavoring agents. Syrups and elixirs may be formulated with sweetening agents, such as, for example, glycerol, sorbitol or sucrose. Such formulations may also contain a demulcent, a preservative, a flavoring or a coloring agent.

The pharmaceutical compositions of the disclosure may be in the form of a sterile injectable preparation, such as, for example, a sterile injectable aqueous or oleaginous suspension. This suspension may be formulated according to the known art using those suitable dispersing or wetting agents and suspending agents which have been mentioned above. The sterile injectable preparation may also be a sterile injectable solution or suspension in a non-toxic parenterally acceptable diluent or solvent, such as, for example, a solution in 1,3-butane-diol or prepared as a lyophilized powder. Among the acceptable vehicles and solvents that may be employed are water, Ringer's solution and isotonic sodium chloride solution. In addition, sterile fixed oils may conventionally be employed as a solvent or suspending medium. For this purpose, any bland fixed oil may be employed including synthetic mono- or diglycerides. In addition, fatty acids such as, for example, oleic acid may likewise be used in the preparation of injectables.

The amount of active ingredient that may be combined with the carrier material to produce a single dosage form will vary depending upon the host treated and the particular mode of administration, such as oral administration or subcutaneous injection. For example, a time-release formulation intended for oral administration to humans may contain approximately 1 to 1000 mg of active material compounded with an appropriate and convenient amount of carrier material which may vary from about 5 to about 95% of the total compositions (weight:weight). The pharmaceutical composition can be prepared to provide easily measurable amounts for administration. For example, an aqueous solution intended for intravenous infusion may contain from about 3 to 500 □g of the active ingredient per milliliter of solution in order that infusion of a suitable volume at a rate of about 30 mL/hr can occur. When formulated for subcutaneous administration, the formulation is typically administered about twice a month over a period of from about two to about four months.

Formulations suitable for parenteral administration include aqueous and non-aqueous sterile injection solutions which may contain anti-oxidants, buffers, bacteriostats and solutes which render the formulation isotonic with the blood of the intended recipient; and aqueous and non-aqueous sterile suspensions which may include suspending agents and thickening agents.

The formulations can be presented in unit-dose or multi-dose containers, for example sealed ampoules and vials, and may be stored in a freeze-dried (lyophilized) condition requiring only the addition of the sterile liquid carrier, for example water for injection, immediately prior to use. Extemporaneous injection solutions and suspensions are prepared from sterile powders, granules and tablets of the kind previously described. Preferred unit dosage formulations are those containing a daily dose or unit daily sub-dose, as herein above recited, or an appropriate fraction thereof, of the active ingredient.

In certain embodiments, the CGRP signaling antagonist and/or inhibitor of the present disclosure may be formulated in any suitable dosage form for an appropriate administration. In certain embodiments, the methods provided herein comprise administering a pharmaceutical composition comprising the CGRP signaling antagonist/inhibitor of the present disclosure and a pharmaceutically acceptable carrier or excipient. Combination formulations and/or treatment according to the present disclosure comprise the CGRP signaling antagonist/inhibitor of the present disclosure together with one or more pharmaceutically acceptable carriers or excipients and optionally other therapeutic agents, now known or later developed, for treating and/or preventing lung disease, particularity NEHI. Combination formulations containing the active ingredient may be in any form suitable for the intended method of administration.

Studies and Data for Establishing and Using the Animal Model of NEHI

The present disclosure provides certain studies and data for establishing the first animal model of NEHI and use of this NEHI animal model for supporting the efficacy of using a small molecule CGRP signaling antagonist which prevents pulmonary edema. In certain embodiments of the present disclosure, the CGRP signaling antagonist used in these studies is olcegepant (BIBN4096BS). The detailed descriptions of the studies and the associated results are presented in the following Examples. The present disclosure also encompasses other known or later developed CGRP signaling antagonists, including, but not limited to, telcagepant (MK-0974), rimegepant (BMS-927711), BI 44370 TA, MK-3207, ubrogepant MK-1602), and MK-8031, for treating pulmonary edema, particularly NEHI.

EXAMPLES

Example 1

Establishing the First Animal Model of NEHI

Recently, case study revealed a novel point mutation on protein NKX2-1 associated with familial NEHI (FIG. 1A). As a key transcriptional factor during lung development, NKX2-1 gene is highly conserved between mouse (SEQ ID NO. 1) and human (SEQ ID NO. 2), with the identified point mutation being identical (FIG. 1B). These findings make it possible to create the first animal model mimicking NEHI symptoms using a genetic approach.

Figures 2A, 2B:
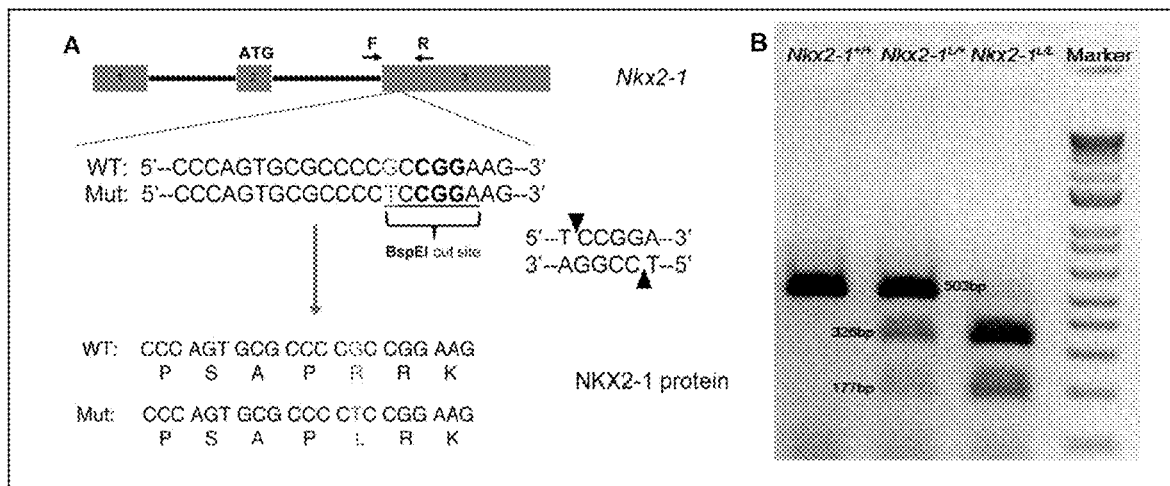
FIGS. 2A-2B. Establishment of the mouse model of NEHI using CRISPR/Cas9 genome editing.

To mimic the human NEHI mutation in mice, the Nkx2-$1^{R191L}$ allele was generated using CRISPR/Cas9 technology. Efficient cutting and homologous directed recombination led to the intended editing giving rise to arginine-to-leucine change at amino acid 191 of NKX2-1 protein, generating the allele termed Nkx2-1$R^{191L}$ (FIG. 2A, see SEQ ID NO. 4; compare to wild type SEQ ID NO. 3). In addition, a silent BspEI restriction site was also introduced that allowed for genotyping by restriction fragment length polymorphism (RFLP) assay (FIG. 2B). One round of injection yielded 19 pups, 5 of which carried the desired change. Founders were first bred to C57Bl/6 wild-type animals for transmission of the allele. To minimize possible off-target mutation in any given founder, F1 progeny from different founders were bred to each other and phenotyping was carried out in their progeny.

Figures 3A, 3B, 3C, 3D, 3E, 3F, 3G, 3H:
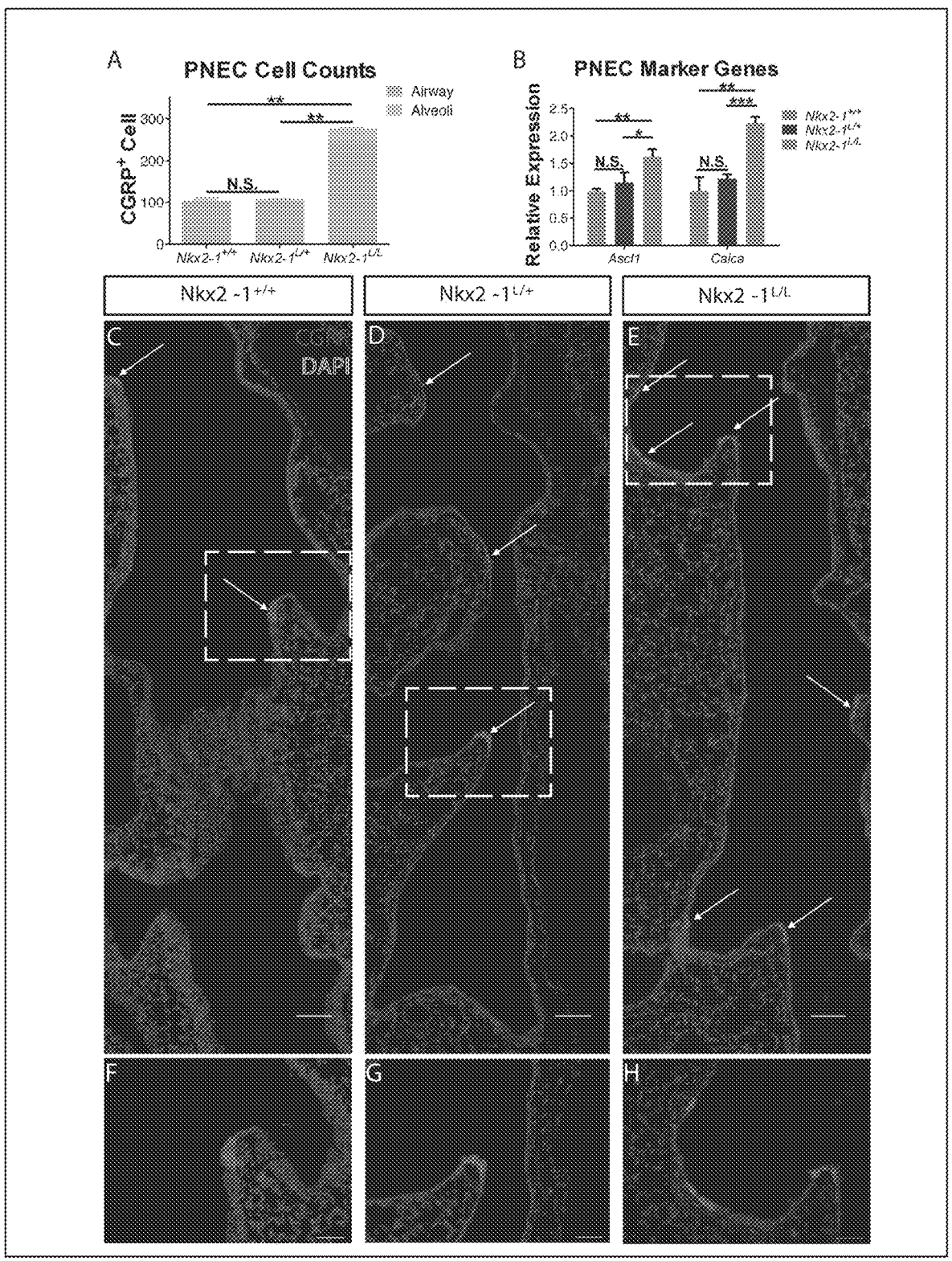
FIGS. 3A-3E. NEHI mouse model displayed PNEC hyperplasia, the namesake feature of NEHI patients.
FIGS. 3F-3H. Magnified views of boxed regions in FIG. 3C-3E.

Next, it was addressed if mice carrying the Nkx2-1$R^{191L}$ allele could recapitulate NEHI phenotypes, thereby serve as an animal model of the disease. The namesake feature of NEHI is PNEC hyperplasia. By counting CGRP+ cells and assaying for transcript level of PNEC markers (Ascl1 and Calca), it was found that Nkx2-$1^{R191L/R191L}$ mutants (hereafter refer as Nkx2-$1^{L/L}$ mutants) showed PNEC hyperplasia compared to heterozygous (Nkx2-$1^{L/+}$) and wildtype (Nkx2-$1^{+/+}$) littermate controls assayed at embryonic day (E) 18.5 (for whole lobe cell counting) and postnatal day (P) 22 (for qPCR). (FIGS. 3A-3B). A vast majority of the increased PNECs were found along the airway as additional cells in PNEC clusters (FIGS. 3C-3H).

Figures 4A, 4B, 4C, 4D, 4E:
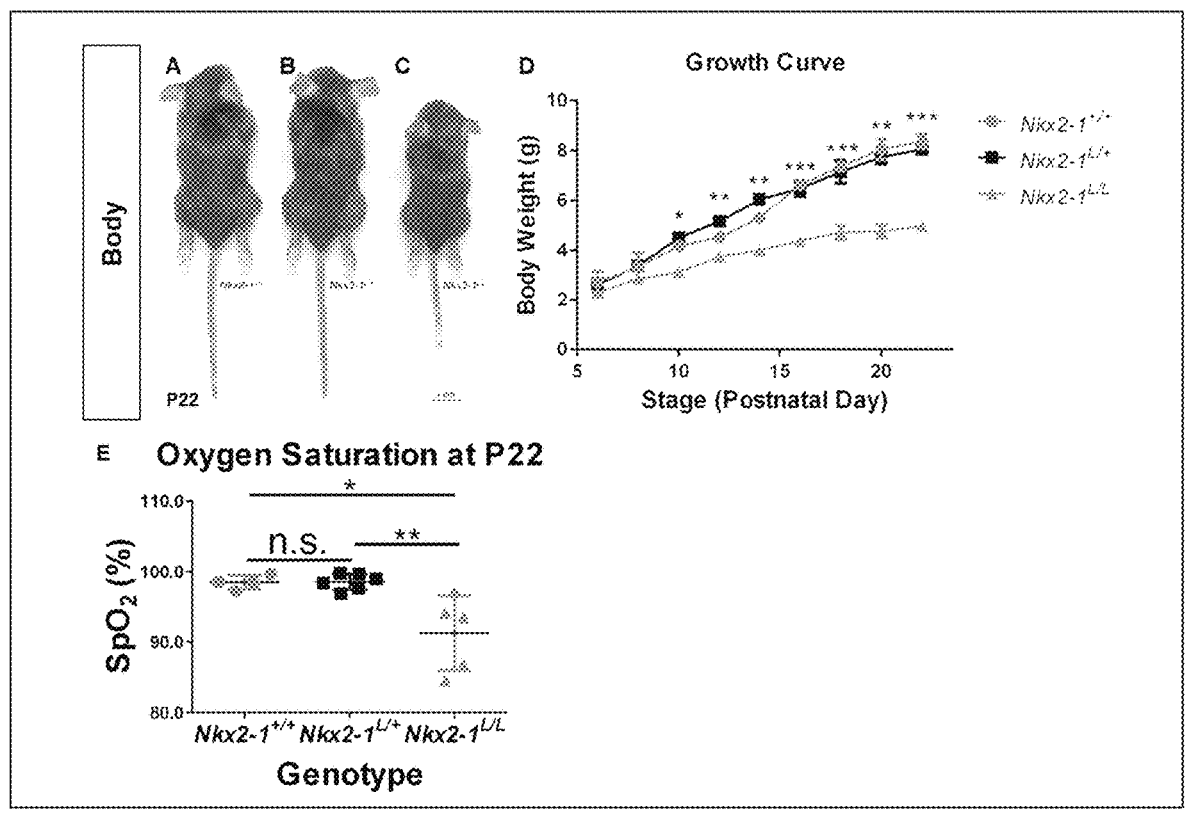
FIGS. 4A-4E. NEHI mouse model displayed growth retardation and poor gas-exchange, defining symptoms of NEHI patients.

NEHI patients fail to thrive and exhibit gas-exchange deficiency starting at ~6-8 months after birth. Similarly, Nkx2-$1^{L/L}$ mutants were born normal in weight but displayed increasing growth retardation which becomes statistically significant at P10 till P22 (FIGS. 4A-D). They also exhibited low oxygen saturation by wean age, suggesting gas-exchange deficiency (FIG. 4E). Therefore, NEHI mouse model displayed growth retardation and poor gas-exchange. These findings demonstrate that the Nkx2-$1^{L/L}$ mouse mutants recapitulate key physiological symptoms presented by NEHI patients and represent the first animal model of this disease.

Example 2

NEHI Mouse Model Exhibited Pulmonary Edema

Figures 5A, 5B, 5C, 5D:
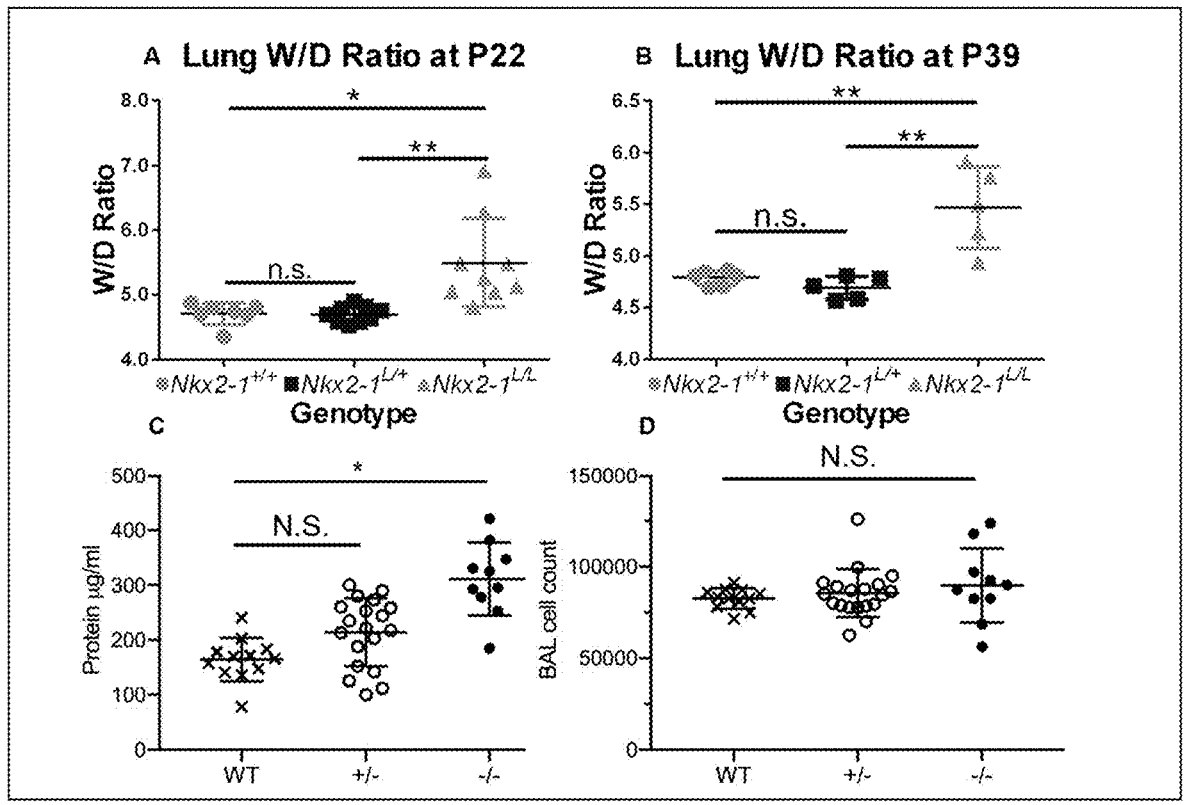
FIGS. 5A-5D. NEHI mouse model exhibited pulmonary edema, which may explain poor gas-exchange and failure to thrive.

A key puzzle of NEHI is the basis for poor gas-exchange given that lung size and alveolar density are both normal. Establishment of the animal model allowed to rigorously test a range of parameters in a controlled genetic background using invasive approaches. It was found that the wet-to-dry (W/D) ratio of mutant lungs was significantly increased at weaning (P22) and further exacerbated at P39, the end of alveologenesis (FIGS. 5A-5B). Analysis of bronchioalveolar lavage (BAL) showed elevated overall protein concentration but not cell number in Nkx2-$1^{L/L}$ mutants compared to their littermate controls, consistent with the lack of inflammation in NEHI patients (FIGS. 5C-5D). These data indicate that there is statistically significant edema in the lungs of this NEHI model, suggesting that the edema may contribute to poor gas-exchange and other physiological features of NEHI.

Example 3

Increased CGRP in NEHI Mouse Model Contributed to Pulmonary Edema

Figures 6A, 6B:
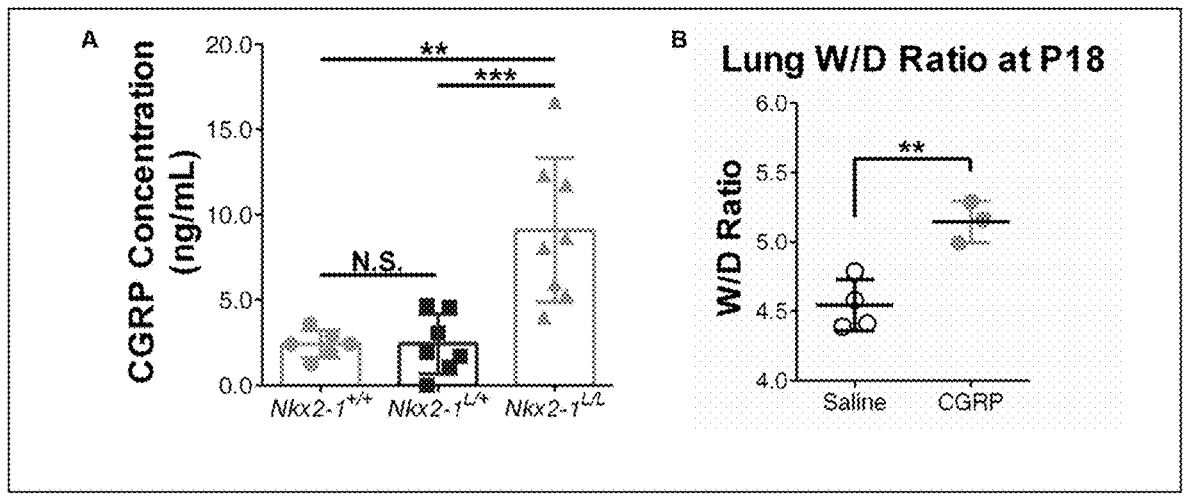
FIGS. 6A-6B. NEHI mouse model show increased CGRP, and excessive CGRP administration in wild-type mouse lung is sufficient to cause pulmonary edema.
Figures 7A, 7B, 7C, 7D, 7E, 7F:
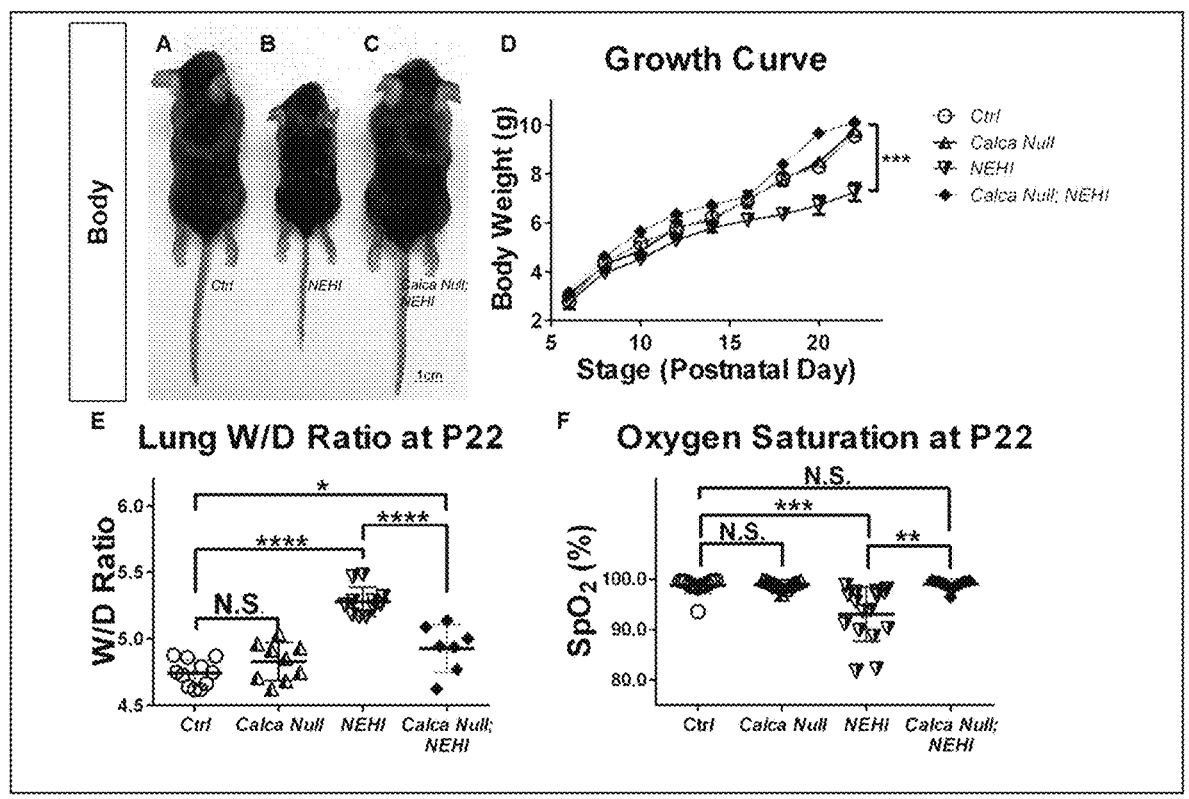
FIGS. 7A-7F. Genetic inactivation of PNEC product CGRP alleviated physiological defects.

Next, molecules that mediate the impact of PNEC hyperplasia on NEHI symptoms were investigated using the NEHI mouse model. As PNECs are known for their production of highly bioactive neuropeptides, neurotransmitters and amines, it is reasoned that PNEC products could be potential mediators. It has been reported that CGRP is a key neuropeptide secreted by PNECs, can act as a vasodilator and can induce edema when injected in the paw. To address if CGRP played a role in the Nkx2-$1^{L/L}$ physiological phenotypes, ELISA was first performed in bronchioalveolar lavage (BAL) and it was found that CGRP level in BAL was significantly increased in Nkx2-$1^{L/L}$ mutants compared to controls, further extending the result that CGRP gene expression is elevated (FIG. 6A). Additionally, when CGRP solution was intranasally administered to wild type pups, the CGRP-treated group showed significant increase of lung W/D ratio, indicating a pulmonary edema phenotype (FIG. 6B). These results suggest that excessive CGRP leads to pulmonary edema in the NEHI mouse model.

Example 4

Genetic Inactivation of CGRP Alleviated Physiological Defects

To test the possibility that increased CGRP would mediate the effect of PNEC hyperplasia in vivo, the Nkx2-$1^{L/L}$; Calca$^{-/-}$ double mutants (Calca Null; NEHI mutants), were generated, where the gene encoding CGRP, Calca, was inactivated in the Nkx2-$1^{L/L}$ mutant background. Importantly, the Nkx2-$1^{L/L}$; Calca$^{-/-}$ double mutants displayed normal body weight at weaning age, with decreased lung W/D ratio and normal oxygen saturation compared to those of wild-type and Nkx2-1$^{L/+}$ control (FIG. 7A-7F). These results indicate that PNEC products, such as CGRP, contributes significantly to edema, oxygen saturation and poor weight gain phenotypes.

Single cell RNAseq data and the LungMap database showed that the CGRP co-receptor, encoded by Calcitonin receptor-like (Calcrl) gene, is specifically expressed by endothelial cells in early postnatal lung. These data suggest the possibility that excess CGRP signals to its receptor on pulmonary endothelial cells to disrupt endothelial barrier integrity and water transport, leading to edema.

Figures 8A, 8B:
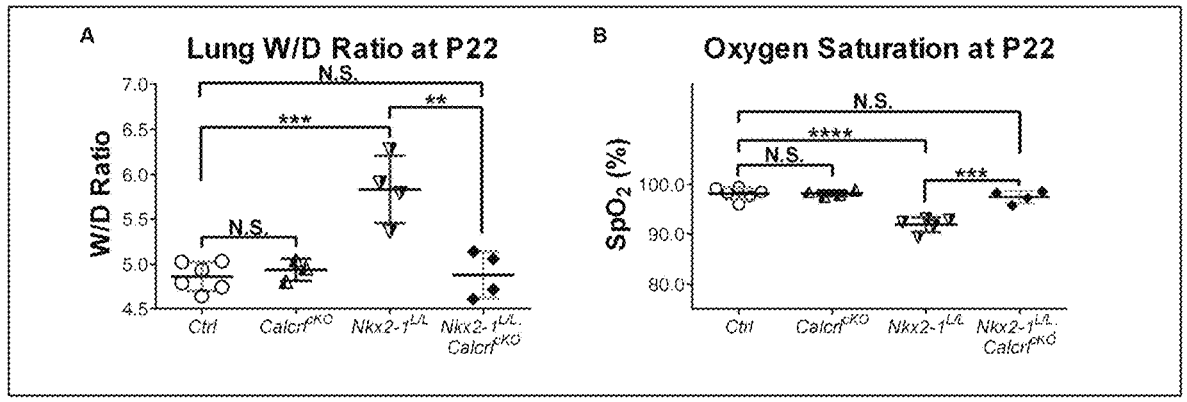
FIGS. 8A-8B. Genetic inactivation of CGRP receptor gene Calcrl in endothelial cells alleviated physiological defects, suggesting that excess CGRP may directly act on endothelial cells.

To address how excessive CGRP would contribute to pulmonary edema, Calcrl in all endothelial cells was inactivated specifically by generating Nkx2-1$^{L/L}$; Cdh5-cre; Calcrl$^{F/F}$ compound mutants (hereafter refer as "Nkx2-1$^{L/L}$; Calcrl$^{cKO}$ mutant"). At weaning, the Nkx2-1$^{L/L}$; Calcrl$^{cKO}$ mutants exhibited decreased lung W/D ratio and increased oxygen saturation compared to Nkx2-1$^{L/L}$ mutants (FIG. 8A-8B). These data provided that genetic inactivation of CGRP receptor gene Calcrl in endothelial cells alleviated physiological defects, suggesting that excess CGRP causes edema and poor gas-exchange by direct acts through endothelial cells and compromising barrier integrity and fluid balance.

Example 5

Pharmacological Inhibition of CGRP Receptor Alleviated NEHI Symptom

Figures 9A, 9B, 9C, 9D:
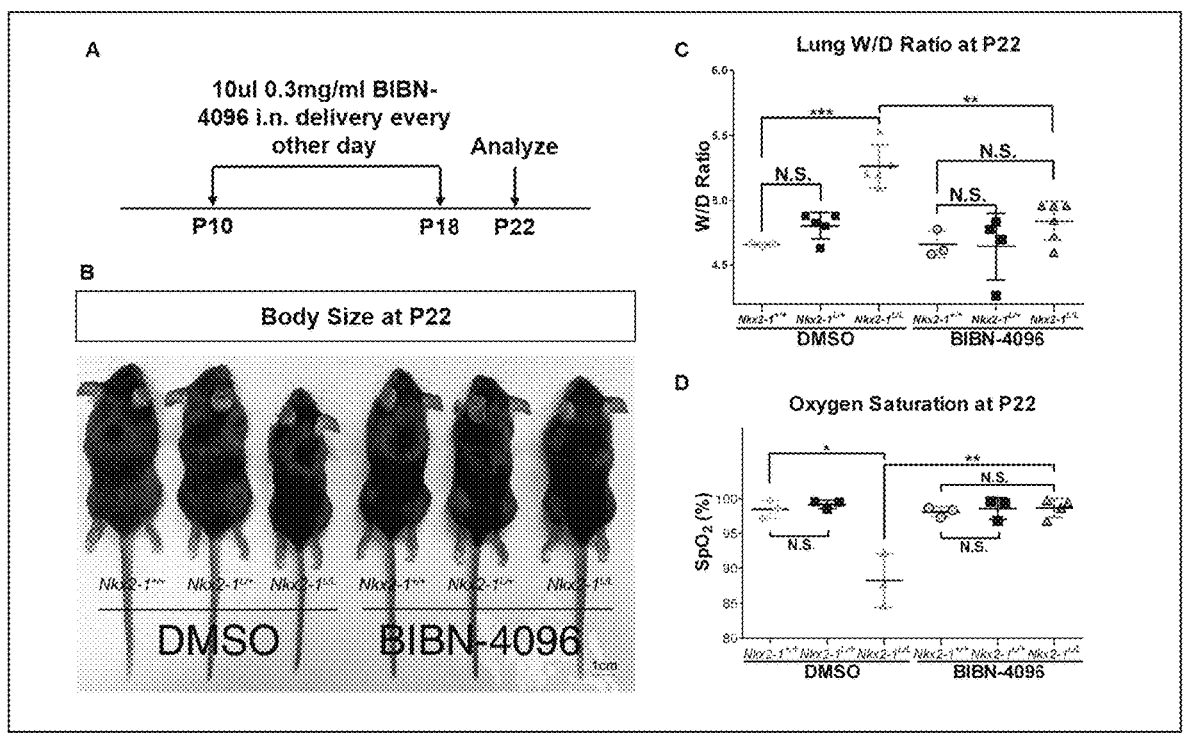
FIGS. 9A-9D. Pharmacological inhibition of CGRP receptor alleviated NEHI symptoms.

To complement the genetic approach and further determine if inhibiting CGRP reverses NEHI symptoms, CGRP function was inhibited locally by intranasal administration of BIBN-4096, a CGRP receptor antagonist between P10 and P18, and it was analyzed at P22 (FIG. 9A). Compared to vehicle DMSO treatment, BIBN-4096 treatment in the control genotype groups did not lead to detectable effects (FIG. 9B). In comparison, in the Nkx2-1$^{L/L}$ mutants, BIBN-4096 treatment led to a clear reversal of pulmonary edema, reduced oxygen saturation, and poor weight gain phenotypes (FIGS. 9B-9D). These findings together demonstrate that PNEC product CGRP plays a key role in the lung to contribute to Nkx2-1$^{L/L}$ phenotypes. Furthermore, the pharmacological result suggests the use of CGRP receptor antagonists as a potential treatment for pulmonary edema and other physiological phenotypes in NEHI, the first targeted therapy for the disease.

Example 6

Methods & Materials

Animals

All mice were housed, and all experimental procedures were carried out in American Association for Accreditation of Laboratory Animal Care accredited facilities and labs at University of California, San Diego. This invention followed the Guide for the Care and Use of Laboratory Animals. Nkx2-1$^{L}$ mouse line was generated in Dr. Xin Sun's lab. Calca$^-$, Cdh5-cre, Calcrl$^f$ mice were reported previously and obtained from public resource. All mice used here were under B6 background when analyses were performed.

Immunofluorescent Staining

The following primary antibody was used at the indicated final concentration for immunofluorescence staining: rabbit anti-Calcitonin gene-related peptide (CGRP) polyclonal antibody [2 mg/ml] (Sigma). The following secondary antibody was used with the indicated final concentration: Cy3-conjugated goat anti-rabbit IgG [2 mg/ml]. Images were acquired by ZEISS AxioImager 2 for all mouse images.

Oxygen Saturation (SpO$_2$) Measurement

Pups were shaved and sensitized by isoflurane while pulse-ox (MouseOxPlus, Starr Life Sciences) was performing. The SpO$_2$ reads were recorded after 5 minutes of stable measurement.

Lung Wet-to-Dry Ratio Measurement

Each lung was removed from sacrificed mouse right after euthanasia. Excessive blood was removed by kimwipe and wet weight m$_w$ was measured right after dissection. The lung was then placed on the foil at 70° C. for 24 hours. Dry weight ma was then measured by reweighing the dried lung. Wet-to-dry ratio was calculated as: W/D ratio=m$_w$/m$_d$.

Bronchoalveolar Lavage (BAL)

After sacrifice, each mouse was intratracheally injected with 1 ml saline by 1 ml insulin syringe (Medline Industries). About 800 ul BAL was then extracted right after and freshly frozen in liquid nitrogen.

BIBN-4096 and CGRP Administration

BIBN-4096 (Fisher Scientific #45-611-0) was dissolved in 100% DMSO (Sigma-Aldrich D2650) and further diluted to working solution with saline before use. 10 ul of 0.3 mg/ml BIBN-4096 was intranasally administrated to pups at P10, P12, P14, P16 and P18. CGRP (Sigma-Aldrich C0292) was dissolved and diluted with saline to reach the working concentration. 10 ul 1 ng/ul CGRP was intranasally administrated to pups at P10, P12, P14 and P16.

ELISA

BAL CGRP concentration was measured by CGRP (rat) EIA Kit (Cayman Chemicals). 200 ul BAL was used in each well. Final readout was performed by microplate reader (TECAN).

REFERENCES

1. Kuo, C. S. & Krasnow, M. A. Formation of a Neurosensory Organ by Epithelial Cell Slithering. *Cell* 163, 394-405, doi:10.1016/j.cell.2015.09.021 (2015).
2. Noguchi, M., Sumiyama, K. & Morimoto, M. Directed Migration of Pulmonary Neuroendocrine Cells toward Airway Branches Organizes the Stereotypic Location of Neuroepithelial Bodies. *Cell Rep* 13, 2679-2686, doi: 10.1016/j.celrep.2015.11.058 (2015).
3. Branchfield, K. et al. Pulmonary neuroendocrine cells function as airway sensors to control lung immune response. *Science* 351, 707-710, doi:10.1126/science.aad7969 (2016).
4. Xie, Y. et al. Mucociliary Transport in Healthy and Cystic Fibrosis Pig Airways. *Ann Am Thorac Soc* 15, S171-S176, doi:10.1513/AnnalsATS.201805-308AW (2018).
5. Cutz, E., Yeger, H. & Pan, J. Pulmonary neuroendocrine cell system in pediatric lung disease-recent advances. *Pediatr Dev Pathol* 10, 419-435, doi:10.2350/07-04-0267.1 (2007).
6. Sui, P. et al. Pulmonary neuroendocrine cells amplify allergic asthma responses. *Science* 360, doi:10.1126/science.aan8546 (2018).
7. Heath, D. et al. Pulmonary endocrine cells in hypertensive pulmonary vascular disease. *Histopathology* 16, 21-28, doi:10.1111/j.1365-2559.1990.tb01055.x (1990).

8. Johnson, D. E., Wobken, J. D. & Landrum, B. G. Changes in bombesin, calcitonin, and serotonin immunoreactive pulmonary neuroendocrine cells in cystic fibrosis and after prolonged mechanical ventilation. *Am Rev Respir Dis* 137, 123-131, doi:10.1164/ajrccm/137.1.123 (1988).
9. Deterding, R. R., Pye, C., Fan, L. L. & Langston, C. Persistent tachypnea of infancy is associated with neuroendocrine cell hyperplasia. *Pediatr Pulmonol* 40, 157-165, doi:10.1002/ppul.20243 (2005).
10. Young, L. R., Deutsch, G. H., Bokulic, R. E., Brody, A. S. & Nogee, L. M. A mutation in TTF1/NKX2.1 is associated with familial neuroendocrine cell hyperplasia of infancy. *Chest* 144, 1199-1206, doi:10.1378/chest.13-0811 (2013).

The preceding Examples are offered for illustrative purposes only and are not intended to limit the scope of the present invention in any way. Various modifications of the invention in addition to those shown and described herein will become apparent to those skilled in the art from the foregoing description and fall within the scope of the appended claims.

What is claimed is:

1. A method of treating a pulmonary edema in a patient comprising administering to the patient a therapeutically effective amount of a CGRP signaling antagonist selected from the group consisting of olcegepant (BIBN4096BS), telcagepant (MK-0974), rimegepant (BMS-927711), BI 44370 TA, MK-3207, ubrogepant (MK-1602), and MK-8031.

2. The method of claim 1, wherein the pulmonary edema is NEHI.

3. The method of claim 1, wherein said method further comprises administering supplemental oxygen.

4. A pharmaceutical composition for treating a pulmonary edema in a patient in need thereof, comprising a therapeutically effective amount of one or more CGRP signaling antagonists selected from the group consisting of olcegepant (BIBN4096BS), telcagepant (MK-0974), rimegepant (BMS-927711), BI 44370 TA, MK-3207, ubrogepant (MK-1602), and MK-8031.

5. The pharmaceutical composition of claim 4, wherein the CGRP signaling antagonist is formulated in a pharmaceutically acceptable carrier or excipients for a proper administration.

6. The pharmaceutical composition of claim 5, wherein the CGRP signaling antagonist is administered via inhalation to the lung of the patient.

7. The pharmaceutical composition of claim 6, wherein administration of the CGRP signaling antagonist via inhalation is accomplished using a dry powder inhaler, a pressurized metered dose inhaler, or a nebulizer.

8. The pharmaceutical composition of claim 4, wherein the pulmonary edema is NEHI.

9. The pharmaceutical composition of claim 4, wherein the pharmaceutical composition further comprises supplemental oxygen.

10. The pharmaceutical composition of claim 4, wherein the pharmaceutical composition is administered with supplemental oxygen.

* * * * *